United States Patent
Ishikawa

(10) Patent No.: US 11,164,354 B2
(45) Date of Patent: *Nov. 2, 2021

(54) SUPERIMPOSITION OF SITUATION EXPRESSIONS ONTO CAPTURED IMAGE

(71) Applicant: NEC Corporation, Tokyo (JP)

(72) Inventor: Masumi Ishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,742

(22) Filed: Feb. 3, 2020

(65) Prior Publication Data

US 2020/0175738 A1 Jun. 4, 2020

Related U.S. Application Data

(63) Continuation of application No. 16/387,702, filed on Apr. 18, 2019, now Pat. No. 10,593,089, which is a (Continued)

(30) Foreign Application Priority Data

Jun. 19, 2014 (JP) .................................. 2014-125866

(51) Int. Cl.
*H04N 5/225* (2006.01)
*G06T 11/60* (2006.01)
(Continued)

(52) U.S. Cl.
CPC .......... *G06T 11/60* (2013.01); *G06K 9/00684* (2013.01); *G06K 9/4604* (2013.01); (Continued)

(58) Field of Classification Search
None
See application file for complete search history.

(56) References Cited

U.S. PATENT DOCUMENTS 10,475,220 B2 * 11/2019 Ishikawa .............. G06K 9/4604
2001/0024233 A1 9/2001 Urisaka et al.
(Continued)

FOREIGN PATENT DOCUMENTS

JP 2003-018462 A 1/2003
JP 2005-099418 A 4/2005
(Continued)

OTHER PUBLICATIONS

International Search Report for PCT Application No. PCT/JP2015/002939, dated Aug. 4, 2015.
(Continued)

*Primary Examiner* — Twyler L Haskins
*Assistant Examiner* — Dwight Alex C Tejano

(57) ABSTRACT

An image signal is received from a camera and a signal is received from each of a number of sensors. For each sensor, a position of a signal source is estimated based on the signal from the sensor. For each sensor, information on a situation expression expressing a situation is extracted based on the signal from the sensor. The situation expression for each sensor is superimposed on a captured image by the camera and the captured image superimposed with the situation expression for each sensor is output. In a case in which the sensors are located at different positions and the situation expression for each sensor overlap at least partially on the captured image, an overlapping order of the situation expressions for the sensors superimposed on the captured image is determined based on a distance between the camera and each sensor.

12 Claims, 21 Drawing Sheets

Related U.S. Application Data continuation of application No. 15/317,212, filed as application No. PCT/JP2015/002939 on Jun. 11, 2015, now Pat. No. 10,475,220.

(51) Int. Cl.

| | | |
|---|---|---|
| *G06K 9/00* | (2006.01) | |
| *H04N 5/272* | (2006.01) | |
| *G06T 7/70* | (2017.01) | |
| *G06K 9/46* | (2006.01) | |
| *H04N 5/232* | (2006.01) | |
| *G08B 13/00* | (2006.01) | |
| *G08B 13/196* | (2006.01) | |
| *G08B 17/12* | (2006.01) | |
| *G08B 29/18* | (2006.01) | |

(52) U.S. Cl.
CPC ............ *G06T 7/70* (2017.01); *H04N 5/23293* (2013.01); *H04N 5/272* (2013.01); *G08B 13/00* (2013.01); *G08B 13/196* (2013.01); *G08B 13/19682* (2013.01); *G08B 17/125* (2013.01); *G08B 29/188* (2013.01)

(56) References Cited

U.S. PATENT DOCUMENTS

| | | |
|---|---|---|
| 2002/0005894 A1 | 1/2002 | Foodman et al. |
| 2002/0067412 A1 | 6/2002 | Kawai et al. |
| 2005/0259149 A1 | 11/2005 | Smaragdis et al. |
| 2006/0004579 A1 | 1/2006 | Claudatos et al. |
| 2006/0155549 A1 | 7/2006 | Miyazaki |
| 2006/0255986 A1 | 11/2006 | Takanezawa et al. |
| 2008/0211929 A1 | 9/2008 | Uchihara |
| 2009/0169060 A1 | 7/2009 | Faenger et al. |
| 2009/0199111 A1* | 8/2009 | Emori ................. H04L 12/1822 715/758 |
| 2012/0081504 A1 | 4/2012 | Ng et al. |
| 2016/0335861 A1* | 11/2016 | Shimura .......... G08B 13/19663 |
| 2017/0140566 A1 | 5/2017 | Ishikawa |
| 2019/0251726 A1 | 8/2019 | Ishikawa |

FOREIGN PATENT DOCUMENTS

| | | | |
|---|---|---|---|
| JP | 2006-121580 A | | 5/2006 |
| JP | 2006-319526 A | | 11/2006 |
| JP | 2008-500603 A | | 1/2008 |
| JP | 2010-183417 A | | 8/2010 |
| JP | 2010183417 A | * | 8/2010 |
| JP | 2011-024242 A | | 2/2011 |
| WO | 2012/070430 A1 | | 5/2012 |
| WO | 2015/194141 A1 | | 12/2015 |

OTHER PUBLICATIONS

English translation of Written opinion for PCT Application No. PCT/JP2015/002939.
Machine Translation of JP-2010183417-A; Akira, Naoto, et al. (Year 2010).
U.S. Office Action and PTO-892 for U.S. Appl. No. 16/387,714 dated Jul. 26, 2019.
Japanese Office Action for JP Application No. 2016-529030 dated Jan. 28, 2020 with English Translation.
Japanese Office Action for JP Application No. 2020-030708 dated Dec. 1, 2020 with English Translation.

* cited by examiner

Fig. 6

| | CAMERA 1 | CAMERA 2 | CAMERA 3 | MICROPHONE 1 | MICROPHONE 2 | MICROPHONE 3 | THERMOMETER 1 | THERMOMETER 2 |
|---|---|---|---|---|---|---|---|---|
| CAMERA 1 | — | ○ | ○ | ○ | ○ | ○ | × | ○ |
| CAMERA 2 | ○ | — | ○ | ○ | × | ○ | ○ | ○ |
| CAMERA 3 | ○ | ○ | — | ○ | ○ | ○ | ○ | ○ |

Fig. 8

|  | CAMERA 1 | CAMERA 2 | CAMERA 3 | MICROPHONE 1 | MICROPHONE 2 | MICROPHONE 3 | THERMOMETER 1 | THERMOMETER 2 |
|---|---|---|---|---|---|---|---|---|
| CAMERA 1 | — | (c12x,c12y) | (c13x,c13y) | (m11x,m11y) | (m12x,m12y) | (m13x,m13y) | × | (h12x,−h12y) |
| CAMERA 2 | (−c21x,c21y) | — | (c23x,c23y) | (−m21x,m21y) | × | (m23x,m23y) | (h21x,h21y) | (h22x,−h22y) |
| CAMERA 3 | (−c31x,c31y) | (c32x,c32y) | — | (−m31x,m31y) | (−m32x,m32y) | (m33x,m33y) | (−h31x,h31y) | (h32x,h32y) |

Fig. 18

| SENSOR SIGNAL | | FEATURE AMOUNT CONDITION | SITUATION EXPRESSION |
|---|---|---|---|
| IMAGE SIGNAL | | THw2 ≤ MOVEMENT OF HUMAN REGION | STRIDING |
| | | THwr1 ≤ MOVEMENT OF HUMAN REGION < THw2 | RUSTLING |
| TEMPERATURE SIGNAL | | THn < TEMPERATURE VARIATION | FIRE |
| VOICE SIGNAL | | VOICE AND THs1 ≤ SOUND LEVEL | BUZZ-BUZZ |
| | | VOICE AND 0 < SOUND LEVEL < THs1 | WHISPERING |
| | | NON-VOICE AND THs2 ≤ SOUND LEVEL | CRASH! |
| | | NON-VOICE AND SOUND LEVEL < THs2 | HISSING |
| | | SOUND LEVEL = 0 | DEAD QUIET |

SUPERIMPOSITION OF SITUATION EXPRESSIONS ONTO CAPTURED IMAGE

This present application is a Continuation application Ser. No. 16/387,702 filed on Apr. 18, 2019, which is a Continuation application Ser. No. 15/317,212 filed on Dec. 8, 2016, (U.S. Pat. No. 10,475,220 issued on Nov. 12, 2019), which is a National Stage Entry of International Application PCT/JP2015/002939 filed on Jun. 11, 2015, which claims the benefit of priority from Japanese Patent Application 2014-125866 filed on Jun. 19, 2014, the disclosures of all of which are incorporated in their entirety by reference herein.

TECHNICAL FIELD

The present invention relates to a technology of presenting related information along with a captured image.

BACKGROUND ART

One would occasionally like to convey an atmosphere of a location where he or she is, to a person at a remote location such as a family living apart and a colleague at a different branch. In such a case, part of an atmosphere of a space where he or she is can be conveyed by capturing an image of a surrounding environment and showing the image. However, a captured image only is not able to completely convey the atmosphere of the space.

For example, a captured image is not able to convey an ambient sound. An example of a technology solving the problem includes a text insertion apparatus described in PTL 1. The text insertion apparatus generates an image with text by converting voice data obtained from an image with voice into text information and inserting the converted text information into a background region or the like in a captured image. Thus, the text insertion apparatus is able to convey an utterance content, an ambient sound, and the like accompanying the captured image, along with the captured image.

Further, there may be a case that a state and a temporal change of a subject cannot be grasped at a glance solely by a captured image only. For example, one feels "jumble up" when seeing a video image of a crowd, and feels "dead quiet" when seeing a video image of an office in which no one is moving even though there are many people. However, it is difficult to grasp such a state and a temporal change solely by one captured image only.

An example of a technology solving the problem includes a sensibility-expression-word processing apparatus described in PTL 2. The sensibility-expression-word processing apparatus stores in advance, a correspondence relation between sensibility information and a sensibility expression word, in a sensibility expression word database. The sensibility information is information indicating a situation of a place, a state of an object, a temporal change of the place, and a movement of the object, being displayed in a captured image. The sensibility expression word is a word expressing an impression of an atmosphere of the place and the object, imaged by a person seeing the captured image. The sensibility-expression-word processing apparatus analyzes the captured image, calculates the sensibility information, selects a sensibility expression word associated with the calculated sensibility information, and superimposes the selected sensibility expression word onto the captured image. Thus, the sensibility-expression-word processing apparatus is able to convey the atmosphere and the impression of the place and the object imaged in the captured image, along with the captured image.

CITATION LIST

Patent Literature

PTL 1: Japanese Unexamined Patent Application Publication No. 2003-18462
PTL 2: International Application Publication No. WO 2012/070430

SUMMARY OF INVENTION

Technical Problem

However, the aforementioned related arts have the following problems.

The text insertion apparatus described in PTL 1 converts auditory information included in a captured video image signal (image with voice) into text information and inserts the information, and therefore is not able to sufficiently convey a situation outside a capture range at a place including the capture range.

Further, the sensibility-expression-word processing apparatus described in PTL 2 superimposes a sensibility expression word based on visual information included in a captured video image signal onto an image in the video image signal, and therefore is not able to sufficiently convey a situation outside a capture range at a place including the capture range.

The present invention is made in order to solve the aforementioned problems, and an object thereof is to provide a technology capable of, when presenting a captured image, sufficiently conveying a situation outside a capture range.

Solution to Problem

To achieve the purpose mentioned above, an information presentation apparatus of the present invention includes: signal input means for inputting an image signal from a camera and a signal from a sensor; signal-source-position estimation means for estimating a position of a signal source, based on the signal from the sensor, situation-expression extraction means for extracting information expressing a situation (situation expression) outside a capture range of the camera, based on the signal from the sensor; display-method determination means for determining a display method of the situation expression on a captured image displayed by the image signal, based on a positional relation between the position of the signal source and a capture range of the camera, and presentation means for superimposing the situation expression onto the captured image, in accordance with the display method; and outputting the captured image superimposed with the situation expression.

An information presentation system of the present invention includes a camera, a sensor, and the information presentation apparatus.

An information presentation method of the present invention includes: inputting an image signal of a camera and a signal from a sensor; estimating a position of a signal source, based on the signal from the sensor; extracting information expressing a situation (situation expression) outside a capture range of the camera, based on the signal from the sensor; determining a display method of the situation expression on a captured image displayed by the image signal, based on a positional relation between the position of the signal source and the capture range of the camera; and superimposing the situation expression onto the captured image, in accordance with the display method, and outputting the captured image superimposed with the situation expression.

A storage medium of the present invention stores an information presentation program causing a computer apparatus to perform: a signal input step of inputting an image signal of a camera and a signal from a sensor; a signal-source-position estimation step of estimating a position of a signal source, based on the signal from the sensor; a situation-expression extraction step of extracting information expressing a situation (situation expression) outside a capture range of the camera, based on the signal from the sensor; a display-method determination step of determining a display method of the situation expression on a captured image displayed by the image signal, based on a positional relation between the position of the signal source and the capture range of the camera; and a presentation step of superimposing the situation expression onto the captured image, in accordance with the display method, and outputting the captured image superimposed with the situation expression.

Advantageous Effects of Invention

The present invention is able to provide a technology capable of, when presenting a captured image, sufficiently conveying a situation outside a capture range.

BRIEF DESCRIPTION OF DRAWINGS

FIG. 6 is a diagram illustrating an example of information stored in an outside-capture-range sensor DB, according to the second example embodiment of the present invention.

FIG. 8 is a diagram illustrating an example of information stored in a sensor positional relation DB, according to the second example embodiment of the present invention.

FIG. 18 is a diagram illustrating an example of information stored in a situation expression DB, according to the second example embodiment of the present invention.

DESCRIPTION OF EMBODIMENTS

Example embodiments of the present invention will be described in detail below with reference to the drawings.

First Example Embodiment

Figure 1:
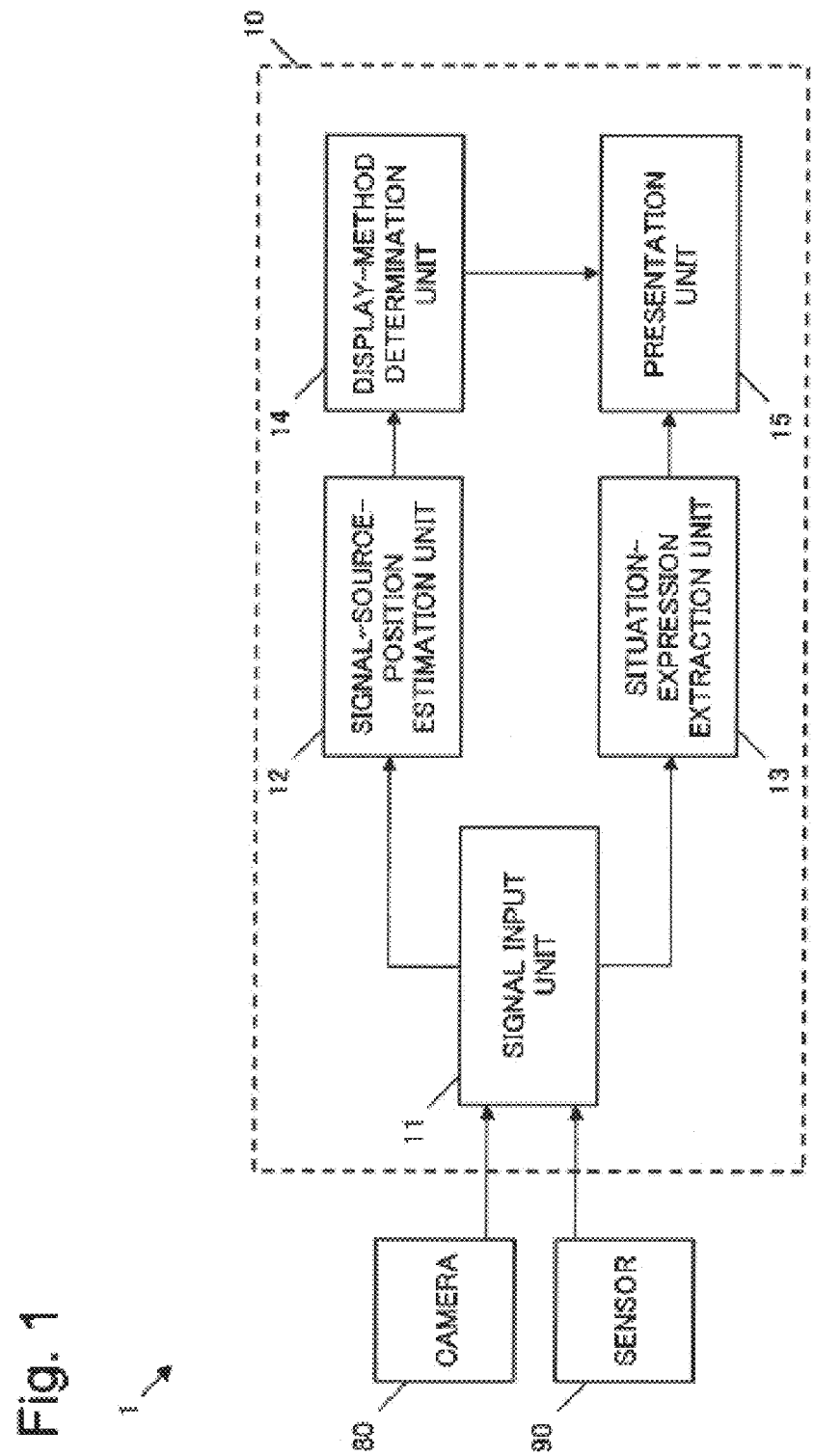
FIG. 1 is a block diagram illustrating a configuration of an information presentation system according to a first example embodiment of the present invention.

FIG. 1 illustrates a configuration of an information presentation system 1 according to a first example embodiment of the present invention.

In FIG. 1, the information presentation system 1 includes an information presentation apparatus 10, a camera 80, and a sensor 90. The information presentation apparatus 10 is communicably connected to the camera 80 and the sensor 90, respectively.

The camera 80 is an apparatus capturing an image of a space and generating an image signal such as a moving image or a still image. The camera 80 is located at a location where an image of at least part of the space being an observation target of the information presentation system 1 can be captured.

While FIG. 1 illustrates one camera 80, a quantity of a camera included in the information presentation system according to the present invention is not limited thereto.

The sensor 90 is an apparatus observing a situation of the space. Specifically, the situation of the space may include a situation of the space itself (e.g. brightness, temperature, and humidity). Further, the situation of the space may include a state of a target object (e.g. a human, an animal, and a thing) existing in the space. A specific example of the sensor 90 observing such the situation of the space includes, for example, a camera (a camera different from the camera 80), a microphone, a depth sensor, a vibration sensor, an illuminometer, a hygrometer, and a thermometer. Further, the sensor 90 may be so configured that an observation direction thereof changes like a pan-tilt camera. Further, the sensor 90 may be so configured that a position thereof changes like a sensor equipped on an automobile, an aircraft, or a robot.

Further, the sensor 90 outputs an observed signal to the information presentation apparatus 10. For example, when the sensor 90 is a camera, the sensor 90 outputs an image signal. For example, when the sensor 90 is the microphone, the depth sensor, the vibration sensor, the illuminometer, the hygrometer, or the thermometer, the sensor 90 outputs a voice signal, a depth signal, a vibration signal, an illuminance signal, a humidity signal, or a temperature signal.

The sensor 90 is located at a location where a situation of the space being the observation target of the information presentation system 1 can be observed. It is desirable that at least one sensor 90 be so located that a situation outside a capture range of the camera 80 in the space being the observation target of the information presentation system 1 can be observed. A sensor 90 so located that the situation outside the capture range of the camera 80 can be observed may be hereinafter referred to as an outside-capture-range sensor 90.

While FIG. 1 illustrates one sensor 90, a quantity of a sensor and a quantity of a type of a sensor, being included in the information presentation system according to the present invention, is not limited thereto.

Figure 2:
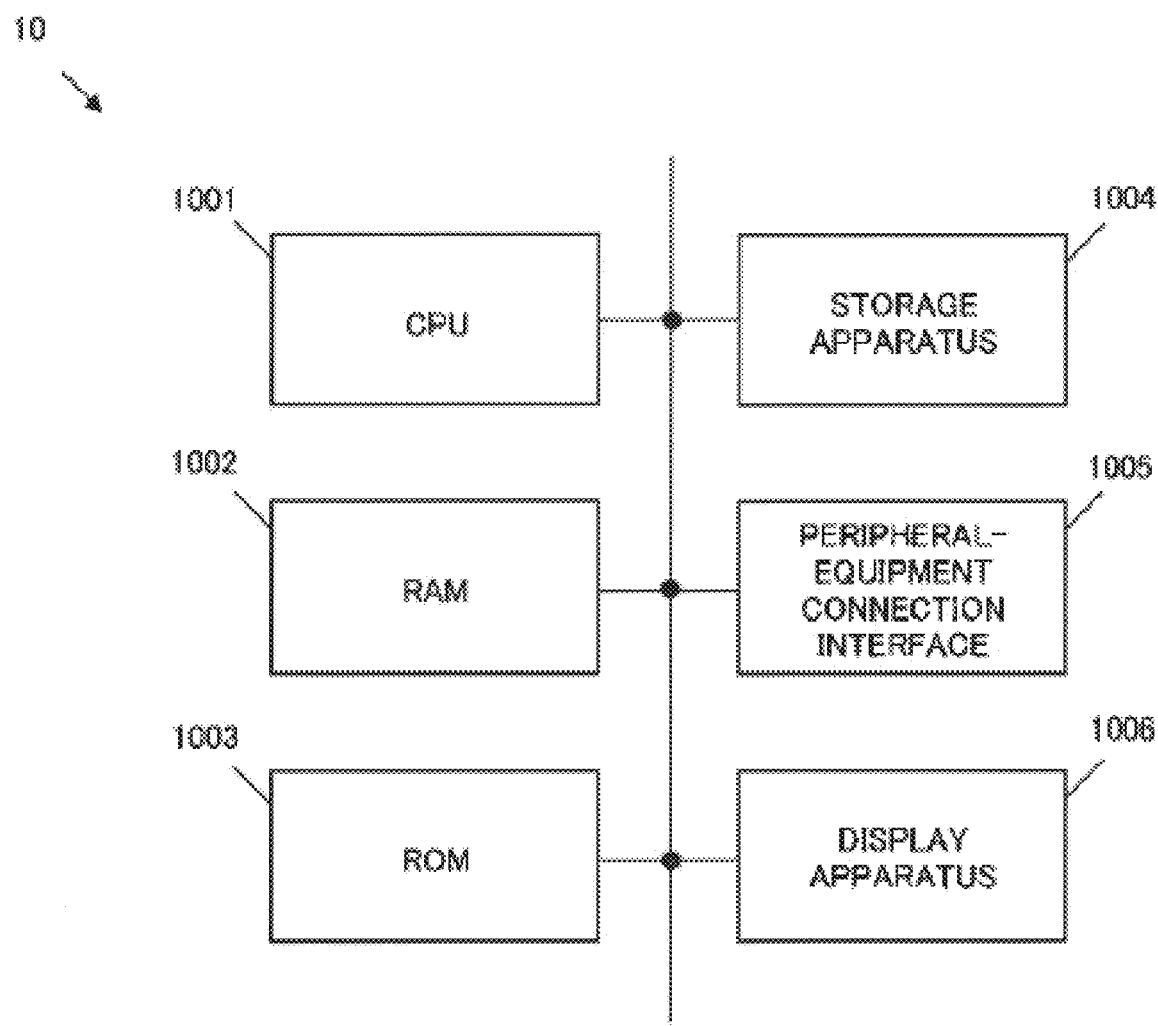
FIG. 2 is a hardware configuration of the information presentation system according to the first example embodiment of the present invention.

The information presentation apparatus 10 includes a signal input unit 11, a signal-source-position estimation unit 12, a situation-expression extraction unit 13, a display-method determination unit 14, and a presentation unit 15. FIG. 2 illustrates an example of a hardware configuration of the information presentation apparatus 10. The information presentation apparatus 10 is composed of a central processing unit (CPU) 1001, a random access memory (RAM) 1002, a read only memory (ROM) 1003, a storage apparatus 1004, a peripheral-equipment connection interface 1005, and a display apparatus 1006.

In this case, the signal input unit 11 is configured by the peripheral-equipment connection interface 1005, and the CPU 1001 reading a computer program and various types of data stored in the ROM 1003 and the storage apparatus 1004 into the RAM 1002, and executing the program and the data. Further, the signal-source-position estimation unit 12, the situation-expression extraction unit 13, and the display-method determination unit 14 are configured by the CPU 1001 reading the computer program and various types of data stored in the ROM 1003 and the storage apparatus 1004 into the RAM 1002, and executing the program and the data. Further, the presentation unit 15 is configured by the display apparatus 1006, and the CPU 1001 reading a computer program and various types of data stored in the ROM 1003 and the storage apparatus 1004 into the RAM 1002, and executing the program and the data. The hardware configuration of the information presentation apparatus 10 and the respective functional blocks thereof are not limited to the aforementioned configuration.

The signal input unit 11 acquires an image signal of the camera 80 and a signal from the sensor 90 as input information. For example, when every sensor 90 is a camera, the signal input unit 11 acquires an image signal from the camera 80 and an image signal from each sensor 90. Further, it is assumed that each of the sensor 90 is a combination of a camera, a microphone, a depth sensor, a vibration sensor, an illuminometer, a hygrometer, and a thermometer. In this case, the signal input unit 11 acquires an image signal from the camera 80, and an image signal, a voice signal, a depth signal, a vibration signal, an illuminance signal, a humidity signal, and a temperature signal from the respective sensors 90. Then, the signal input unit 11 feeds the signals acquired from the sensors 90 to the signal-source-position estimation unit 12 and the situation-expression extraction unit 13. Further, the signal input unit 11 may feed the image signal acquired from the camera 80 to the display-method determination unit 14 and the presentation unit 15. Alternatively, the signal input unit 11 may temporarily store the image signal acquired from the camera 80 into the storage apparatus 1004, and feed the signal to the display-method determination unit 14 and the presentation unit 15 via the storage apparatus 1004.

The signal-source-position estimation unit 12 estimates a position of a signal source, in accordance with a signal from the sensor 90. The signal source is an origin of a signal being a source (factor) of a situation and an atmosphere of a space, or an observation target of the sensor 90, and includes, for example, origins of a sound, vibration, light, heat, and humidity in the space, and a still object and a moving object existing in the space. For example, the signal-source-position estimation unit 12 may estimate a position of the signal source by analyzing the signals from the sensor 90. Further, for example, the signal-source-position estimation unit 12 may apply a position of the sensor 90 outputting a signal as the position of the signal source.

The situation-expression extraction unit 13 extracts information expressing the situation (situation expression) outside the capture range of the camera 80, based on a signal from the sensor 90. For example, the situation-expression extraction unit 13 may extract the situation expression as a situation outside the capture range, based on a signal obtained from the sensor 90 located outside of the capture range of the camera 80. The situation expression extracted based on the signal obtained from the sensor 90 may also be hereinafter referred to as a situation expression of the sensor 90, a situation expression regarding the signal source (of the sensor 90), a situation expression of the signal source, or the like.

"Extraction" refers to determining and outputting the situation expression matching the signal obtained from the sensor 90. Further, the situation expression is information visually representing an atmosphere and a situation of the space. It is desirable that the situation expression be visual information by which an observer is able to instantaneously grasp the atmosphere and the situation of the space. For example, a text image expressing a text, and an image expressing a symbol such as a symbol image, an icon image, and a stamp image may be applied as such the situation expression.

For example, when the signal from the sensor 90 indicates activation of lighting, the situation-expression extraction unit 13 may extract a text image of a sensibility word "Flash," as the situation expression. In addition, the situation expression may include a text image of a sensibility word such as "Warming up" indicating a temperature rise by air conditioning, "Splash" indicating a humidity rise when water is spilled, "Striding" indicating how a person walks, and "Chattering" indicating how a person speaks. Further, the situation expression may also include a typical utterance such as "Eek" indicating a scream and "Hello" indicating a greeting, and a text image indicating a designation regarding a situation and an atmosphere such as "Lights out," "Fire," "Scream," and "Anomaly." Furthermore, the situation expression may also include a symbol image such as "!" indicating occurrence of an anomaly, and an icon with high conspicuity such as a red lamp indicating an anomaly. In addition, any information visually representing the atmosphere and the situation of the space is applicable as another situation expression.

The display-method determination unit 14 determines a display method of the situation expression on the captured image of the camera 80, based on a positional relation between the position of the signal source and the capture range of the camera 80. The captured image of the camera 80 refers to an image displayed by the image signal supplied from the camera 80 to the signal input unit 11. For example, when the image signal supplied from the camera 80 is a still image, the input still image is applied as the captured image. Further, for example, when the image signal input from the camera 80 is a moving image, one or more frame images constituting the input moving image is applied as the captured image.

For example, the display-method determination unit 14 may determine a display position on the captured image as the display method of the situation expression. Specifically, the display-method determination unit 14 may determine the display position of the situation expression regarding the signal source, in accordance with a relative direction of the position of the signal source with respect to the capture range of the camera 80. In addition, the display-method determination unit 14 may determine the display position of the situation expression regarding the signal source, in accordance with a distance between the capture range and the position of the signal source.

The presentation unit 15 superimposes the situation expression onto the captured image, in accordance with a display method determined by the display-method determination unit 14, and outputs the captured image superimposed with the situation expression. For example, the presentation unit 15 superimposes the situation expression onto the display position determined by the display-method determination unit 14. Then, the presentation unit 15 may output the captured image superimposed with the situation expression to the display apparatus 1006. Further, for example, the presentation unit 15 may output the captured image superimposed with the situation expression to the storage apparatus 1004. Further, for example, the presentation unit 15 may output the captured image superimposed with the situation expression to another apparatus connected via a network interface (unillustrated) or the like.

Figure 3:
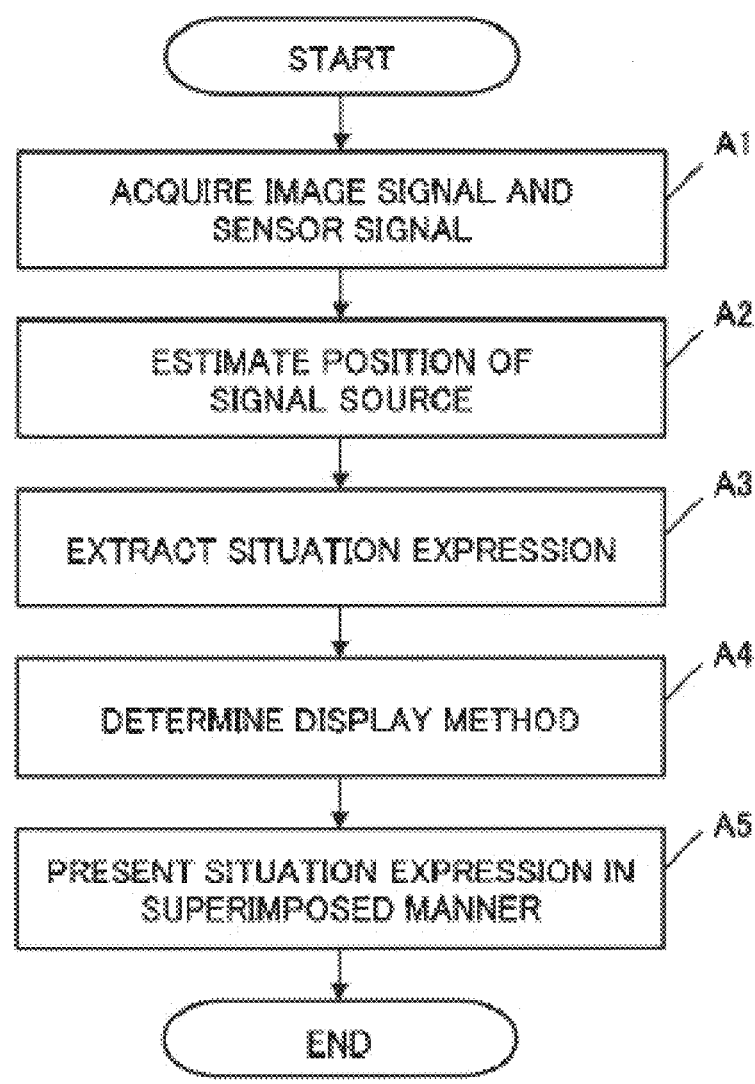
FIG. 3 is a flowchart illustrating an operation of the information presentation system according to the first example embodiment of the present invention.

An operation of the information presentation system 1 configured as described above will be described with reference to FIG. 3.

The signal input unit 11 acquires an image signal from the camera 80 and a signal from the sensor 90 as inputs (Step A1).

The signal-source-position estimation unit 12 estimates a position of a signal source, in accordance with the signal from the sensor 90 (Step A2). For example, as described above, the signal-source-position estimation unit 12 may apply a position of the sensor 90 as the position of the signal source, or may estimate the position of the signal source by analyzing the signal.

The situation-expression extraction unit 13 extracts a situation expression outside the capture range of the camera 80, in accordance with the signal from the sensor 90 (Step A3). For example, as described above, the situation-expression extraction unit 13 may extract the situation expression outside the capture range, in accordance with the signal obtained from the outside-capture-range sensor 90 of the camera 80.

The display-method determination unit 14 determines the display method on the captured image of the camera 80, with respect to the situation expression extracted in Step A3 (Step A4). For example, as described above, the display-method determination unit 14 may determine the display position of the situation expression on the captured image, in accordance with the relative direction and the distance of the position of the signal source with respect to the capture range of the camera 80.

The presentation unit 15 superimposes each situation expression extracted in Step A3 onto the captured image displayed by the image signal of the camera 80 input in Step A1, in accordance with the display method determined in Step A4, and outputs the captured image superimposed with the situation expression (Step A5).

The above concludes the operation of the information presentation system 1.

Next, an effect of the first example embodiment of the present invention will be described.

When presenting a captured image, the information presentation system according to the first example embodiment of the present invention is able to more sufficiently convey a situation outside a capture range.

The reason is that the signal input unit acquires an image signal from the camera and a signal from a sensor as inputs, the signal-source-position estimation unit estimates a position of a signal source, in accordance with the signal from the sensor, and the situation-expression extraction unit extracts a situation expression outside a capture range, based on the signal from the sensor. Further, an additional reason is that the display-method determination unit determines a display method on a captured image, based on a positional relation between the position of the signal source and the capture range, and the presentation unit superimposes the situation expression onto the captured image, in accordance with the determined display method, and outputs the captured image superimposed with the situation expression.

Thus, the present example embodiment superimposes the situation expression outside the capture range onto the captured image by the display method based on the positional relation between the capture range and the position of the signal source, and therefore is able to convey a situation occurring outside the capture range and an approximate location of the occurrence, along with the captured image.

Second Example Embodiment

Next, a second example embodiment according to the present invention will be described with reference to drawings. In the respective drawings referred to in the description of the present example embodiment, a same component as and a step operating similarly to the first example embodiment according to the present invention are respectively given same reference signs as the first example embodiment, and detailed description thereof is omitted in the present example embodiment.

Figure 4:
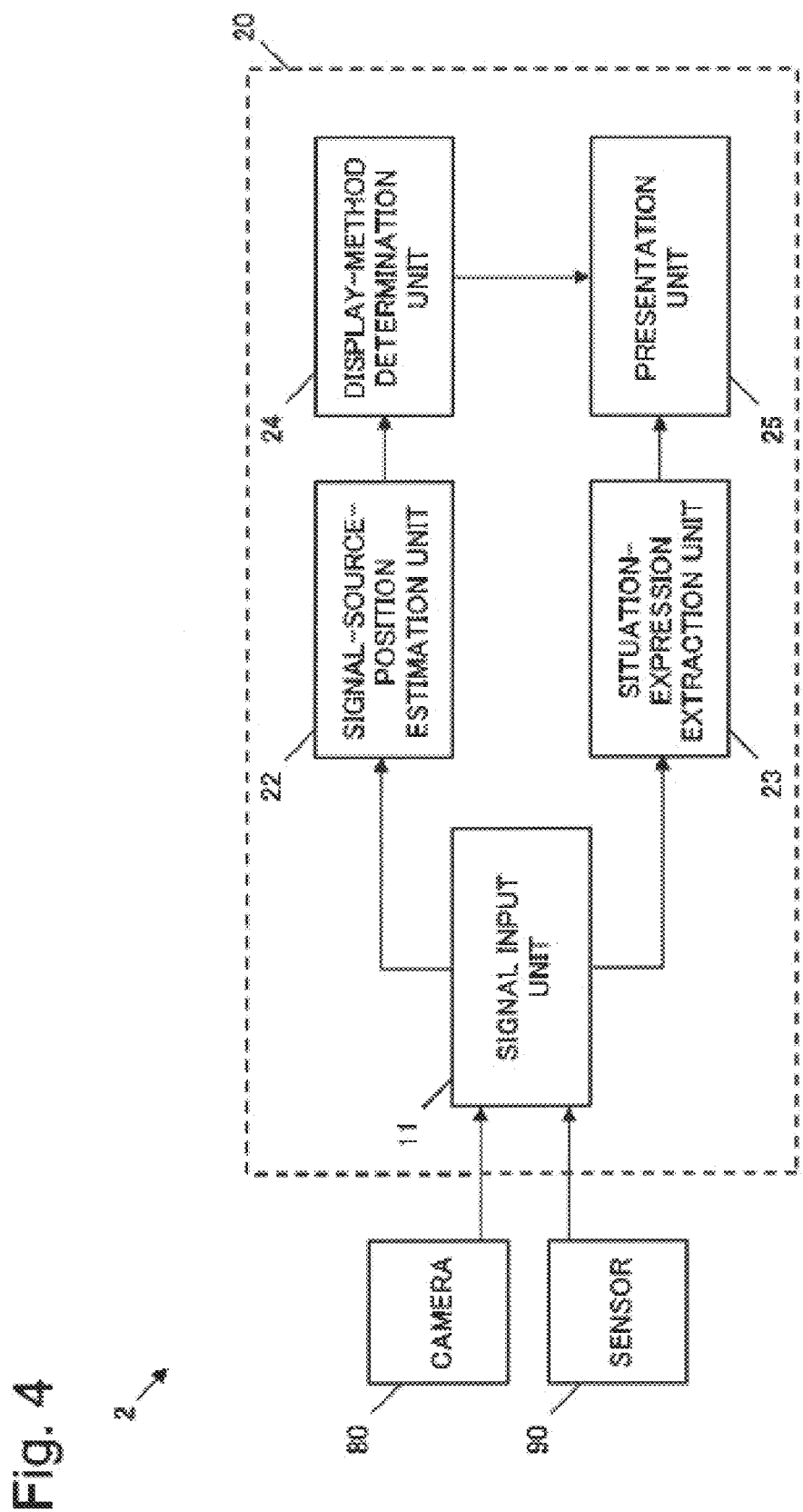
FIG. 4 is a block diagram illustrating a configuration of an information presentation system according to a second example embodiment of the present invention.

FIG. 4 illustrates a configuration of an information presentation system 2 according to the second example embodiment of the present invention.

In FIG. 4, the information presentation system 2 differs from the information presentation system 1 according to the first example embodiment of the present invention in including an information presentation apparatus 20 instead of the information presentation apparatus 10. The information presentation apparatus 20 is communicably connected to the camera 80 and the sensor 90, respectively. While FIG. 4 illustrates one each of the camera 80 and the sensor 90, a quantity of the camera, a quantity of the sensor, and a quantity of a type of the sensor, being included in the information presentation system according to the present invention is not limited thereto.

The information presentation apparatus 20 differs from the information presentation apparatus 10 according to the first example embodiment of the present invention in including a signal-source-position estimation unit 22 instead of the signal-source-position estimation unit 12, and a situation-expression extraction unit 23 instead of the situation-expression extraction unit 13. The information presentation apparatus 20 further differs from the information presentation apparatus 10 in including a display-method determination unit 24 instead of the display-method determination unit 14, and a presentation unit 25 instead of the presentation unit 15.

Nearly similarly to the signal-source-position estimation unit 12 according to the first example embodiment of the present invention, the signal-source-position estimation unit 22 estimates a position of a signal source, based on a signal from the sensor 90. The signal-source-position estimation unit 22 according to the present example embodiment in particular estimates the position of the signal source as follows, in respective cases of the signal source being a sound, a moving object, and a human.

When the signal source is a sound, the signal-source-position estimation unit 22 is able to estimate the position of the signal source as follows. It is assumed that a plurality of microphones are located as sensors 90. In this case, the signal-source-position estimation unit 22 compares frequency components and compares energy, of respective sound signals acquired from the plurality of microphones. Then, the signal-source-position estimation unit 22 may determine a position of a microphone (sensor 90) capturing a sound signal having the highest energy out of sounds composed of a same type of a frequency component, to be a position of the source of the sound signal.

Further, when the signal source is a moving object, the signal-source-position estimation unit 22 is able to estimate a position of the signal source as follows. It is assumed that a camera and a depth sensor are located as sensors 90 at a nearly same position in a nearly same observation direction. In this case, the signal-source-position estimation unit 22 observes point group data in a three-dimensional space for a certain period of time, in accordance with an image signal and a depth signal obtained from the camera and the depth sensor. Then, the signal-source-position estimation unit 22 detects a positional shift with respect to a point group on an image region demarcated in accordance with an image feature such as a color and an edge. Then, the signal-source-position estimation unit 22 may estimate a center coordinate out of the point group the positional shift of which is detected, in a coordinate system based on the camera and the depth sensor, as a position of the moving object.

Furthermore, when the signal source is a human, the signal-source-position estimation unit 22 is able to estimate a position of the signal source as follows. It is assumed that a camera is located as the sensor 90. In this case, the signal-source-position estimation unit 22 detects a human region, in accordance with an image signal from the camera as the sensor 90. Then, the signal-source-position estimation unit 22 may estimate a position of the human being the signal source, by use of a table or a conversion function associating in advance a position on an image obtained from the camera as the sensor 90 with a position in the space. Further, in this case, as a detection technique of the human region, the signal-source-position estimation unit 22 may use a background subtraction method detecting a region different from a space image created in advance as the human region. Alternatively, as a detection technique of the human region, the signal-source-position estimation unit 22 may use template matching scanning an input image with a template image of a human region created in advance, and detecting a region having a similar image characteristic to the human region. Another known technology may be adopted in detection processing of a human region, without being limited to the above.

While an example of an estimation technique of a position of a signal source has been cited for each case of the signal source being a sound, a moving object, and a human, as described above, the signal-source-position estimation unit 22 may use another technology for estimating a position of a signal source with respect to the various types of signal sources. Further, the signal-source-position estimation unit 22 may use various known technologies for estimating a position of a signal source with respect to signal sources other than the aforementioned types.

Further, when an observation direction or a position of the sensor 90 changes, the signal-source-position estimation unit 22 estimates a position of a signal source in view of the change in observation direction and position. In this case, the sensor 90 may be equipped with a position detection sensor or a direction detection sensor in advance. The position detection sensor may be a global positioning system (GPS) or another sensor capable of detecting the position. Further, the direction detection sensor may be a gyro-sensor or another sensor capable of detecting the direction. Then, in accordance with information obtained from the position detection sensor or the direction detection sensor, the signal-source-position estimation unit 22 may specify a position and an observation direction of the sensor in a world coordinate system, and estimate a position of the signal source by use of the specified information about the position and the observation direction.

The situation-expression extraction unit 23 extracts the situation expression outside the capture range of the camera 80 with respect to a signal from the sensor 90, by use of a situation expression database (DB) and an outside-capture-range sensor DB. Additionally, the situation-expression extraction unit 23 may extract the situation expression within the capture range of the camera 80.

The situation expression DB stores information associating information about a signal obtainable from the sensor 90 with the situation expression. The situation expression DB is prepared in advance and stored in the storage apparatus 1004 or the like. The information about a signal obtainable from the sensor 90 may be a condition related to a feature amount of a signal obtainable from the sensor 90. Further, the information about a signal obtainable from the sensor 90 may be a condition related to a temporal change of a signal obtainable from the sensor 90 or a feature amount of the signal.

Further, the situation expression DB may associate the situation expression with a condition combining signals from a plurality of sensors 90, and store the situation expression. In this case, the situation-expression extraction unit 23 may extract the situation expression associated with a condition met by a combination of signals respectively input from the plurality of sensors 90. For example, the situation-expression extraction unit 23 is able to extract the situation expression indicating a fire when a combination of a temperature signal from a thermometer and an illuminance signal from an illuminometer meets a condition indicating rise in both temperature and illuminance. Further, the situation-expression extraction unit 23 is able to extract the situation expression indicating occurrence of an incident when a combination of a voice signal from a microphone and an image signal from a camera as the sensor 90 meets a condition indicating a voice with a certain sound level or higher, and movement of a certain number of people or more.

The outside-capture-range sensor DB stores information indicating whether or not the sensor 90 is the outside-capture-range sensor 90 of the camera 80. The outside-capture-range sensor 90 may be defined as the sensor 90 having an observation region in which a region not included in the capture range of the camera 80 exists. In this case, the outside-capture-range sensor 90 is defined regardless of whether an located position of the sensor 90 is within the capture range of the camera 80 or outside the capture range.

For example, when the information presentation system 2 includes the plurality of cameras 80 and the plurality of sensors 90, the outside-capture-range sensor DB may store information indicating whether or not each sensor 90 is the outside-capture-range sensor 90 with respect to each camera 80. Further, when the information presentation system 2 includes the plurality of cameras 80, each camera 80 may be applied as the camera 80 according to the present example embodiment, and, for each camera 80, another camera 80 may be applied as the sensor 90 according to the present example embodiment. In this case, the outside-capture-range sensor DB may store information indicating, for each camera 80, whether or not another camera 80 is the outside-capture-range sensor 90.

Figure 5:
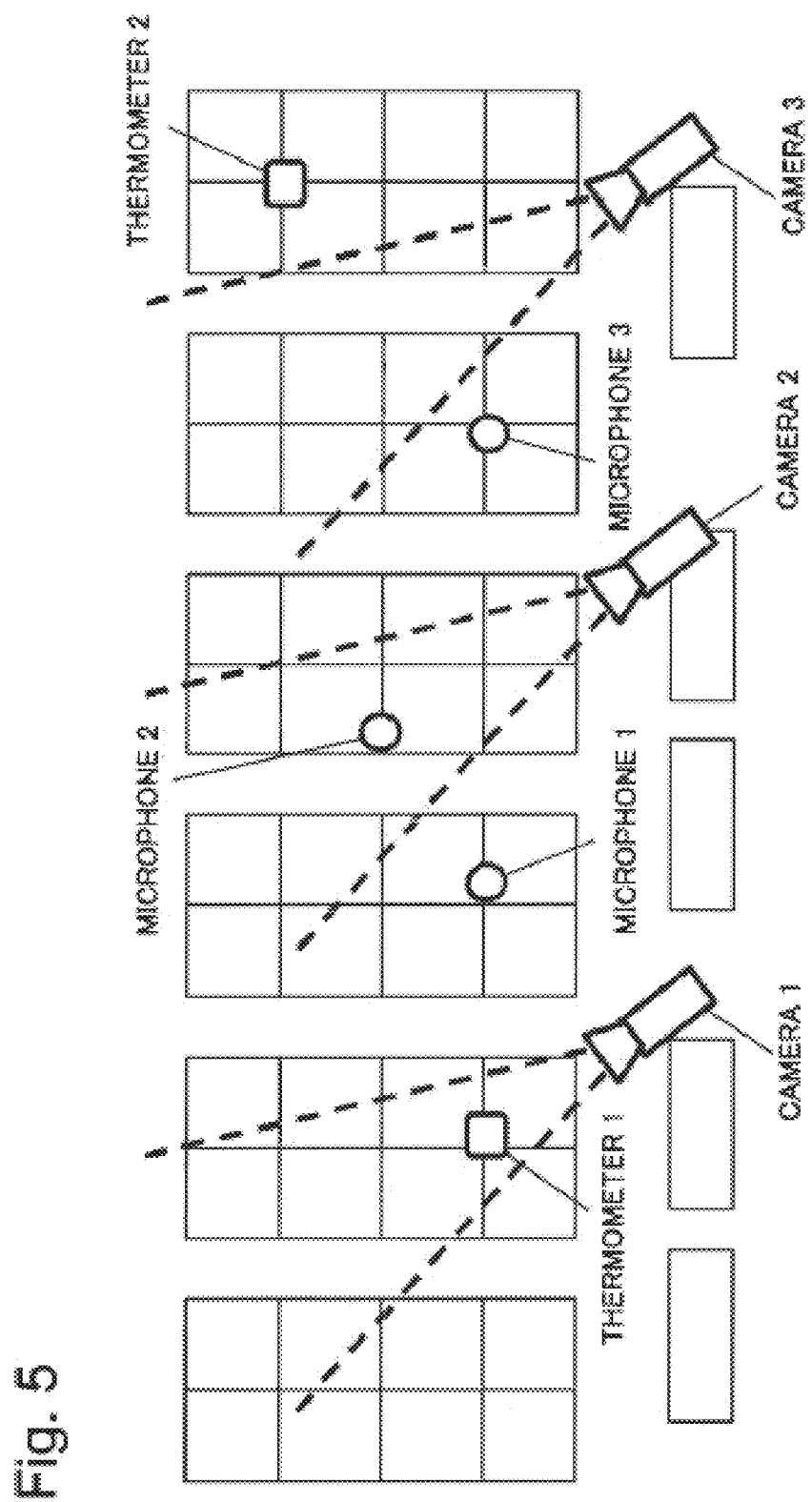
FIG. 5 is a diagram illustrating an example of arrangement of a camera and a sensor, according to the second example embodiment of the present invention.

For example, it is assumed that the information presentation system 2 includes, in an observation space thereof, three cameras 1 to 3, three microphones 1 to 3, and two thermometers 1 and 2, as illustrated in FIG. 5. FIG. 5 illustrates a desk layout in an office. In FIG. 5, each rectangle represents a desk, and a space between rectangles represents an aisle through which a person is able to pass.

In this case, the outside-capture-range sensor DB may store information as listed in FIG. 6. For example, in FIG. 6, the first row indicates that the cameras 2 and 3, the microphones 1 to 3, and the thermometer 2 are outside-capture-range sensors 90 of the camera 1, and the thermometer 1 is not the outside-capture-range sensor 90 of the camera 1 (a sensor 90 within the capture range). Thus, the outside-capture-range sensor DB may have a format storing information representing the outside-capture-range sensor 90 by "○," and storing information representing the sensor 90 within the capture range by "×," for each camera 80. By referring to such the outside-capture-range sensor DB, the situation-expression extraction unit 23 may specify the outside-capture-range sensor 90 of a given camera 80, and extract a situation expression outside the capture range of the camera 80 by use of a signal from the specified sensor 90. The outside-capture-range sensor DB may store information in another format, without being limited to the format in FIG. 6.

Further, when a position or an observation direction of the sensor 90 changes, the situation-expression extraction unit 23 may appropriately update the outside-capture-range sensor DB. For example, when the sensor 90 is equipped with a position detection sensor and a direction detection sensor, as described above, the situation-expression extraction unit 23 acquires information held by the position detection sensor and the direction detection sensor, along with a signal from the sensor 90. Then, the situation-expression extraction unit 23 may update the outside-capture-range sensor DB, in accordance with whether or not a region not included in the capture range of the camera 80 exists in an observation region of the sensor 90, being calculated in accordance with information held by the position detection sensor and the direction detection sensor.

Further, as described above, the situation-expression extraction unit 23 may extract a situation expression within the capture range of the camera 80, in addition to extracting a situation expression outside the capture range of the camera 80. In this case, the situation-expression extraction unit 23 may extract a situation expression from the situation expression DB, corresponding to a signal input to the signal input unit 11 from a sensor 90 predetermined to be within the capture range of the camera 80, and take the situation expression as a situation expression within the capture range of the camera 80. The situation-expression extraction unit 23 is able to specify the sensor 90 within the capture range of the camera 80 by referring to the outside-capture-range sensor DB.

The display-method determination unit 24 determines a display method of a situation expression on a captured image of the camera 80, based on a positional relation between a position of the signal source and the capture range of the camera 80. At this time, the display-method determination unit 24 determines a detailed display method as follows, in addition to determining the display position of the situation expression on the captured image, similarly to the display-method determination unit 14 according to the first example embodiment of the present invention.

For example, the display-method determination unit 24 may determine a shape or a size of the situation expression on the captured image. The shape may include, for example, a shape of a surrounding frame of a text image as the situation expression, and a shape transforming the text image itself. Further, as the display method, the display-method determination unit 24 may determine a transmissivity when superimposing the situation expression onto the captured image. As the display method, the display-method determination unit 24 may determine a movement of the situation expression on the captured image. It is assumed that the movement of the situation expression refers to a temporal change (e.g. blinking, moving, and a change rate thereof) of the display method of the situation expression. The movement of the situation expression is not limited to blinking, moving, and a change rate thereof, and may be another movement expressible on the captured image. Further, as the display method, the display-method determination unit 24 may determine whether or not to superimpose a balloon and an effect line accompanying a situation expression, for indicating a direction of a signal source starting from a position of the camera 80.

Further, the display-method determination unit 24 may determine a display method of a situation expression, in view of a moving speed and a moving direction of a signal source, or importance (a degree of interest and urgency for an observer) of the signal source. When at least part of a display region of a situation expression overlaps with a display region of another situation expression, the display-method determination unit 24 may determine an overlapping order (an order of foreground/background) of the situation expressions on a captured image. For example, the display-method determination unit 24 may determine the overlapping order in accordance with distances between the camera 80 and the sensors 90 being origins of the respective extracted situation expressions. Alternatively, the display-method determination unit 24 may determine the overlapping order of the situation expressions, based on importance preset to the respective situation expressions, or importance preset to the sensors 90 being origins of the respective extracted situation expressions.

As described above, the display-method determination unit 24 may determine a display method capable of conveying, to an observer, a position of a signal source outside a capture range, and a situation and an atmosphere of a space caused by the signal source.

Further, the display-method determination unit 24 may determine display methods as described above, by use of the sensor positional relation DB. The sensor positional relation DB stores information indicating the positional relation between the capture range of the camera 80 and the position of the sensor 90. Such the sensor positional relation DB is prepared in advance, and is stored in the storage apparatus 1004 or the like. It is assumed that the positional relation stored in the sensor positional relation DB is pre-calculated or pre-measured.

For example, the sensor positional relation DB may store a position coordinate of the sensor 90 in a coordinate system based on the camera 80. Alternatively, the sensor positional relation DB may store a position coordinate of any point included in an observation region of the sensor 90 in a coordinate system based on the camera 80. For example, when the sensor 90 is a camera, the sensor positional relation DB may store a position coordinate of any point on an optical axis of the camera being the sensor 90 in the coordinate system based on the camera 80. The coordinate system based on the camera 80 may be a two-dimensional coordinate indicating a position on the captured image of the camera 80. The two-dimensional coordinate indicating the position on the captured image of the camera may also be hereinafter referred to as a camera image coordinate.

Figure 7:
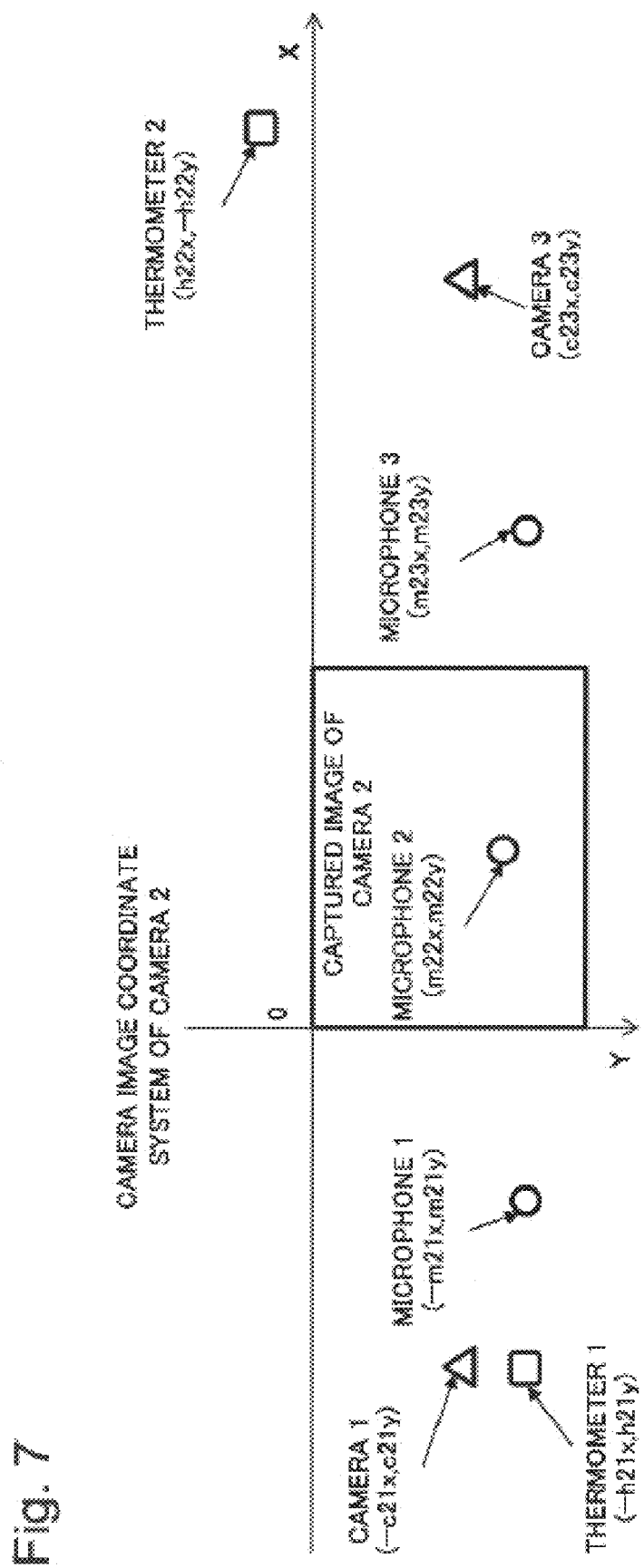
FIG. 7 is a schematic diagram illustrating a positional relation between a camera and a sensor, according to the second example embodiment of the present invention.

For example, it is assumed that, with respect to the camera 2 illustrated in FIG. 5, a position coordinate of another sensor 90 in a camera image coordinate system of the camera 2 is indicated as FIG. 7. In this case, the sensor positional relation DB stores information as listed in FIG. 8.

When a position of the sensor 90 is applied as a position of a signal source, the display-method determination unit 24 may refer to the sensor positional relation DB and determine the display method, by use of a position coordinate of the sensor 90 in a coordinate system based on the camera 80. When the position of the signal source based on the position of the sensor 90 is estimated as a position of a signal source, the display-method determination unit 24 calculates a positional relation between the position of the signal source and the capture range as follows. Specifically, the display-method determination unit 24 refers to the sensor positional relation DB, and obtains a position coordinate of the sensor 90 in the coordinate system based on the camera 80. Then, the display-method determination unit 24 may calculate a position coordinate of the signal source in the coordinate system based on the camera 80, in accordance with the position coordinate of the sensor 90 in the coordinate system based on the camera 80, and the position of the signal source based on the position of the sensor 90.

As described above, the display-method determination unit 24 may calculate the position coordinate of the signal source in the camera image coordinate system of the camera 80, in accordance with a position of the signal source estimated by the signal-source-position estimation unit 22, and determine a display method of a situation expression on a captured image, based on the calculated position coordinate.

In addition, the sensor positional relation DB may store a relative three-dimensional position coordinate of the sensor 90 with respect to the camera 80 in a three-dimensional space (e.g. a world coordinate system). Further, the sensor positional relation DB may store information indicating a relative direction of the sensor 90 with respect to the camera 80. The information indicating the relative direction may include, for example, leftward, rightward, above, and below.

Further, when a position and an observation direction of the camera 80 or the sensor 90 change, the display-method determination unit 24 may calculate a positional relation between the camera 80 and the sensor 90, in accordance with the change in position and observation direction, and update the sensor positional relation DB. For example, when the camera 80 and the sensor 90 are respectively equipped with a position detection sensor and a direction detection sensor, the display-method determination unit 24 is able to update the sensor positional relation DB, in accordance with signals from the position detection sensor and the direction detection sensor.

The display-method determination unit 24 may adopt, for example, the techniques cited below as specific examples of determination processing of a display method.

(103-A) Display-Method Determination Technique Based on Position Coordinate of Sensor 90

It is assumed that a position of the sensor 90 itself is applied by the signal-source-position estimation unit 22 as a position of a signal source. It is further assumed that the sensor positional relation DB stores a position coordinate of the sensor 90 in a camera image coordinate system of the camera 80. In this case, the display-method determination unit 24 may determine a display method as follows.

Figure 9:
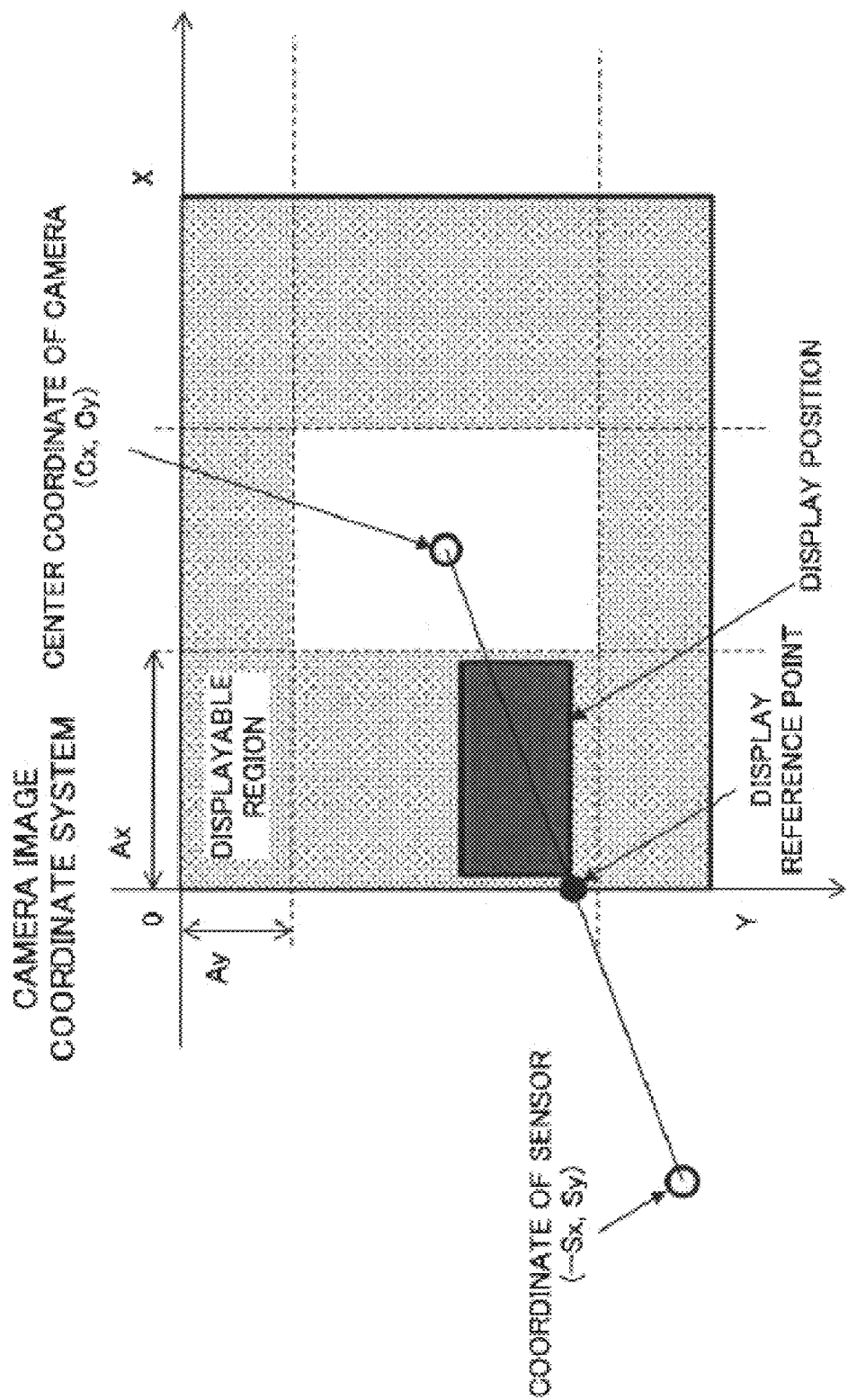
FIG. 9 is a schematic diagram illustrating an example of a determination technique of a display method, according to the second example embodiment of the present invention.
Figure 10:
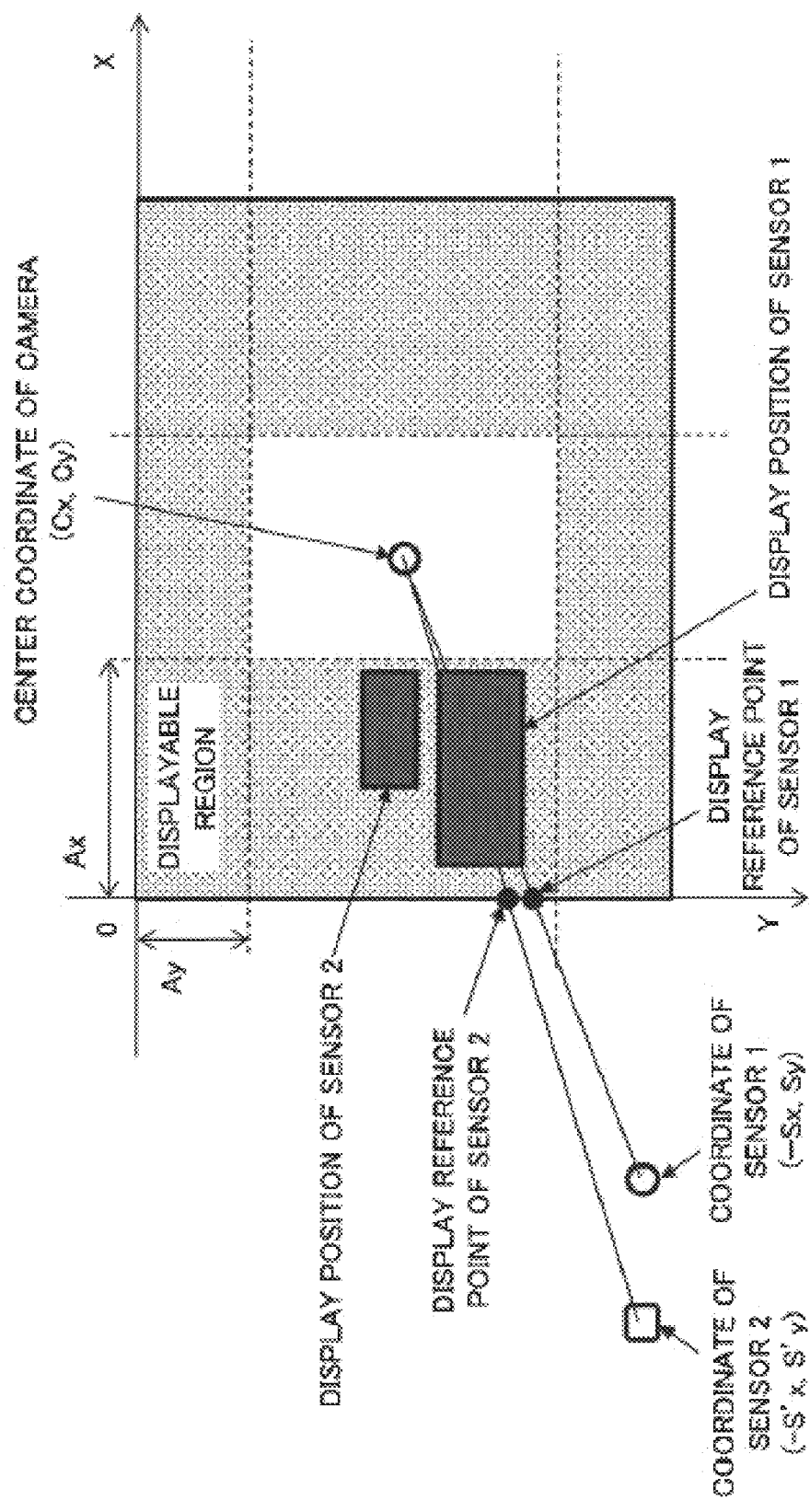
FIG. 10 is a schematic diagram illustrating another example of a determination technique of a display method, according to the second example embodiment of the present invention.

First, as illustrated in FIG. 9, the display-method determination unit 24 determines an intersection of a line connecting a center (Cx,Cy) of a captured image of the camera 80 and a coordinate (−Sx,Sy) of the sensor 90, and a boundary of the captured image of the camera 80, in a camera image coordinate system of the camera 80, as a display reference point of a situation expression. Then, the display-method determination unit 24 determines a region with a predetermined range based on the display reference point in a preset displayable region in the captured image, as a tentative display position. The displayable region is predetermined as a region onto which the situation expression can be superimposed. For example, the displayable region may be determined as a region on the captured image corresponding to an angle range predetermined within an angle of view of the camera 80. As illustrated in FIG. 9, such a displayable region may be determined as, for example, a region defined by a length Ax in an x-direction and a length Ay in a y-direction, inward from the boundary of the captured image (a shaded region in FIG. 9). Then, when there is no overlap with the display position determined with respect to another signal source, the display-method determination unit 24 employs and determines the tentative display position as the display position for the situation expression with respect to the signal source. Further, with respect to the situation expression of each signal source, the display-method determination unit 24 may adjust a size, a transmissivity, a distance from the display reference point, and the like, in accordance with a distance between the image center of the camera 80 and a coordinate of the signal source. For example, it is assumed, as illustrated in FIG. 10, that a distance between the image center (Cx,Cy) of the camera 80 and a coordinate (−Sx,Sy) of a sensor 1 is shorter than a distance between the image center and a coordinate (−S'x,S'y) of a sensor 2. In this case, the display-method determination unit 24 determines respective display positions of situation expressions so that a distance between a situation expression of the sensor 1 and a display reference point thereof is shorter than a distance between a situation expression of the sensor 2 and a display reference point thereof. Further, in this case, the display-method determination unit 24 determines respective sizes of the situation expressions so that the situation expression of the sensor 1 is larger than the situation expression of the sensor 2. When the situation expression displays text, the display-method determination unit 24 may preset, as a situation expression size, a minimum size for an observer to be able to read the text, and determine a size of the situation expression to be larger than or equal to the preset size.

(103-B) Display-Method Determination Technique Based on Position Coordinate of Signal Source It is assumed that a position of a signal source based on a position of the sensor 90 is estimated by the signal-source-position estimation unit 22 as the position of the signal source. It is further assumed that the sensor positional relation DB stores a position coordinate of the sensor 90 in a camera image coordinate system of the camera 80. Further, as an example, a case that the camera 2 in FIG. 5 is designated as the camera 80, and the camera 1 as the sensor 90, is considered. In this case, the display-method determination unit 24 may determine a display method as follows.

Figure 11:
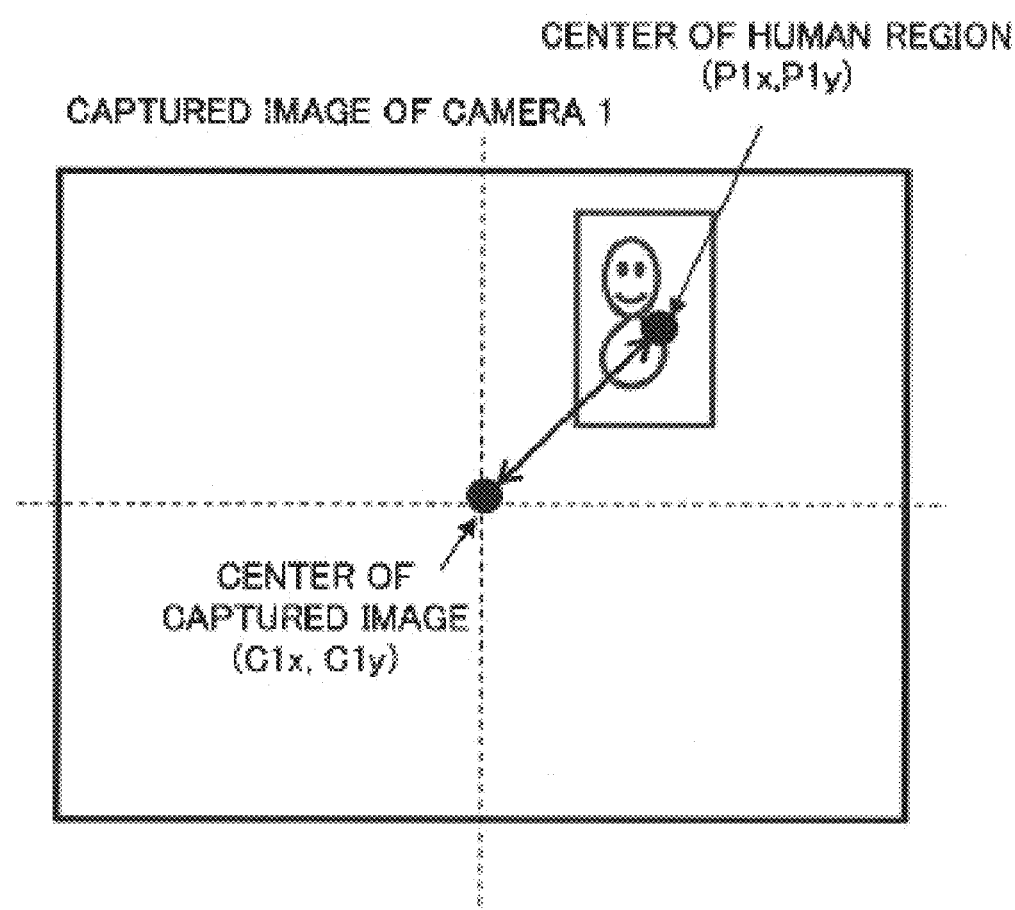
FIG. 11 is a schematic diagram illustrating another example of a determination technique of a display method, according to the second example embodiment of the present invention.
Figure 12:
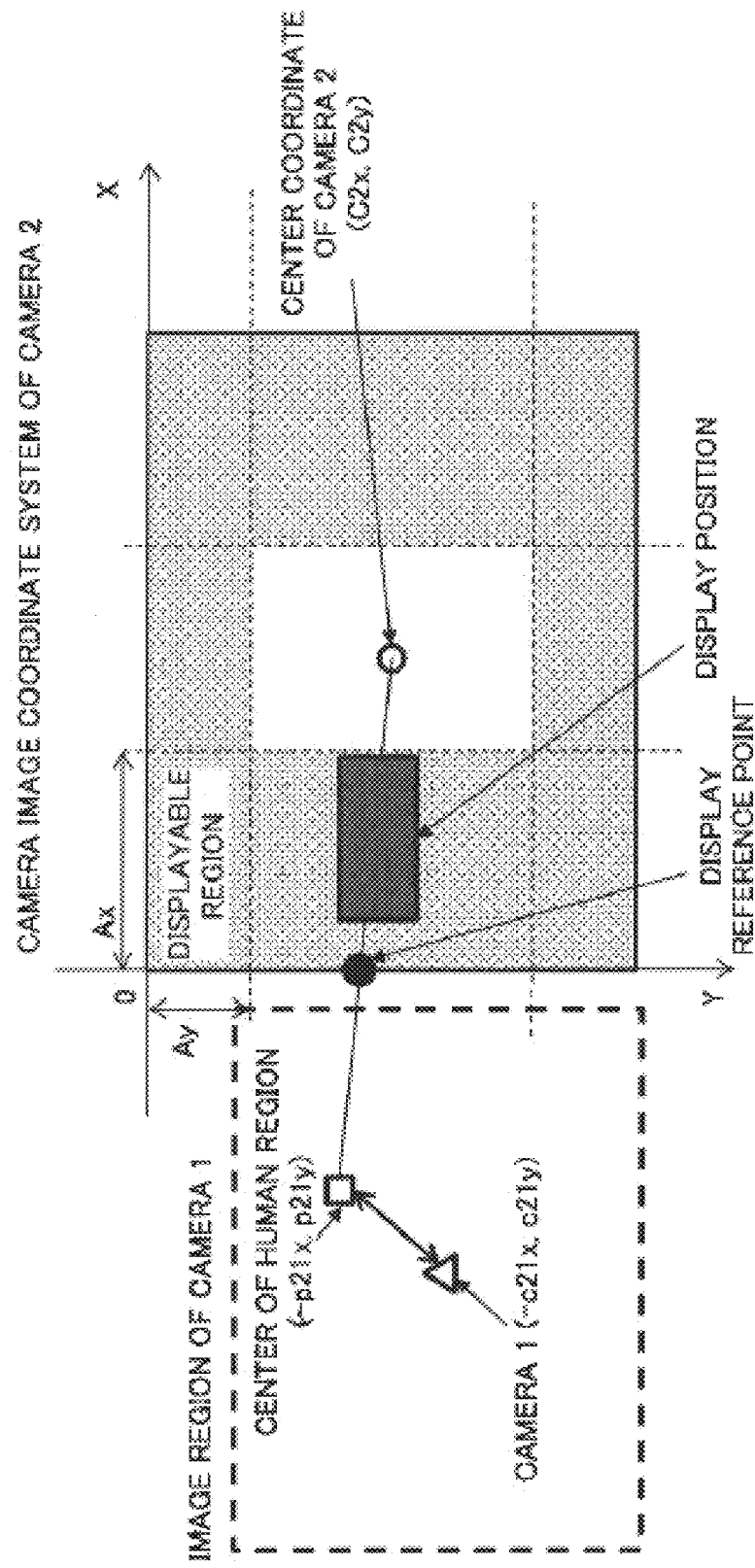
FIG. 12 is a schematic diagram illustrating another example of a determination technique of a display method, according to the second example embodiment of the present invention.

As illustrated in FIG. 11, in a captured image of the camera 1 as the sensor 90, a human region is detected, and a center coordinate (P1x,P1y) of the human region is estimated with respect to a center (C1x,C1y) of the captured image of the camera 1. Then, the display-method determination unit 24 obtains a position coordinate (−c21x,c21y) of the camera 1 as the sensor 90 in a camera image coordinate system of the camera 2 as the camera 80, from the sensor positional relation DB in FIG. 8. Then, as illustrated in FIG. 12, the display-method determination unit 24 calculates a center coordinate (−p21x,p21y) of the human region in the camera image coordinate system of the camera 2. The center coordinate (−p21x,p21y) of the human region in the camera image coordinate system of the camera 2 can be calculated from the position coordinate (−c21x,c21y) of the camera 1 in the camera image coordinate system of the camera 2 and the center coordinate (P1x,P1y) of the human region with respect to the image center of the camera 1. Then, the display-method determination unit 24 determines an intersection of a line connecting a captured image center (C2x, C2y) of the camera 2 and the center coordinate (−p21x,p21y) of the human region, and a frame of a captured image of the camera 2, as a display reference point. Then, the display-method determination unit 24 determines a region within a predetermined range from the display reference point as the display position of the situation expression regarding the human.

When a movement of the human region is detected in an image signal from the camera 1 being the sensor 90, the display-method determination unit 24 may determine a movement of a situation expression, in accordance with the movement of the human region. For example, when a human displayed in the human region moving in a direction toward the camera 2 being the camera 80 is detected, the display-method determination unit 24 may determine a temporal change of a transmissivity of the situation expression so that the transmissivity is reduced as the human approaches the camera 2. Further, in this case, the display-method determination unit 24 may set a flag indicating that the transmissivity of the situation expression is to be reduced from the transmissivity thereof when superimposed onto the captured image in an immediately preceding frame.

(103-C) Display-Method Determination Technique Based on Relative Direction (e.g. "Above," "Below," "Leftward," and "Rightward")

It is assumed that the sensor positional relation DB stores "above," "below," "rightward," and "leftward" as information indicating a relative direction of the sensor 90 with respect to the camera 80. As a position of a signal source, either one of a position of the sensor 90 itself, and a case of using a relative position of the signal source with respect to the position of the sensor 90, may be applied. In this case, the display-method determination unit 24 may determine a display method as follows.

Figure 13:
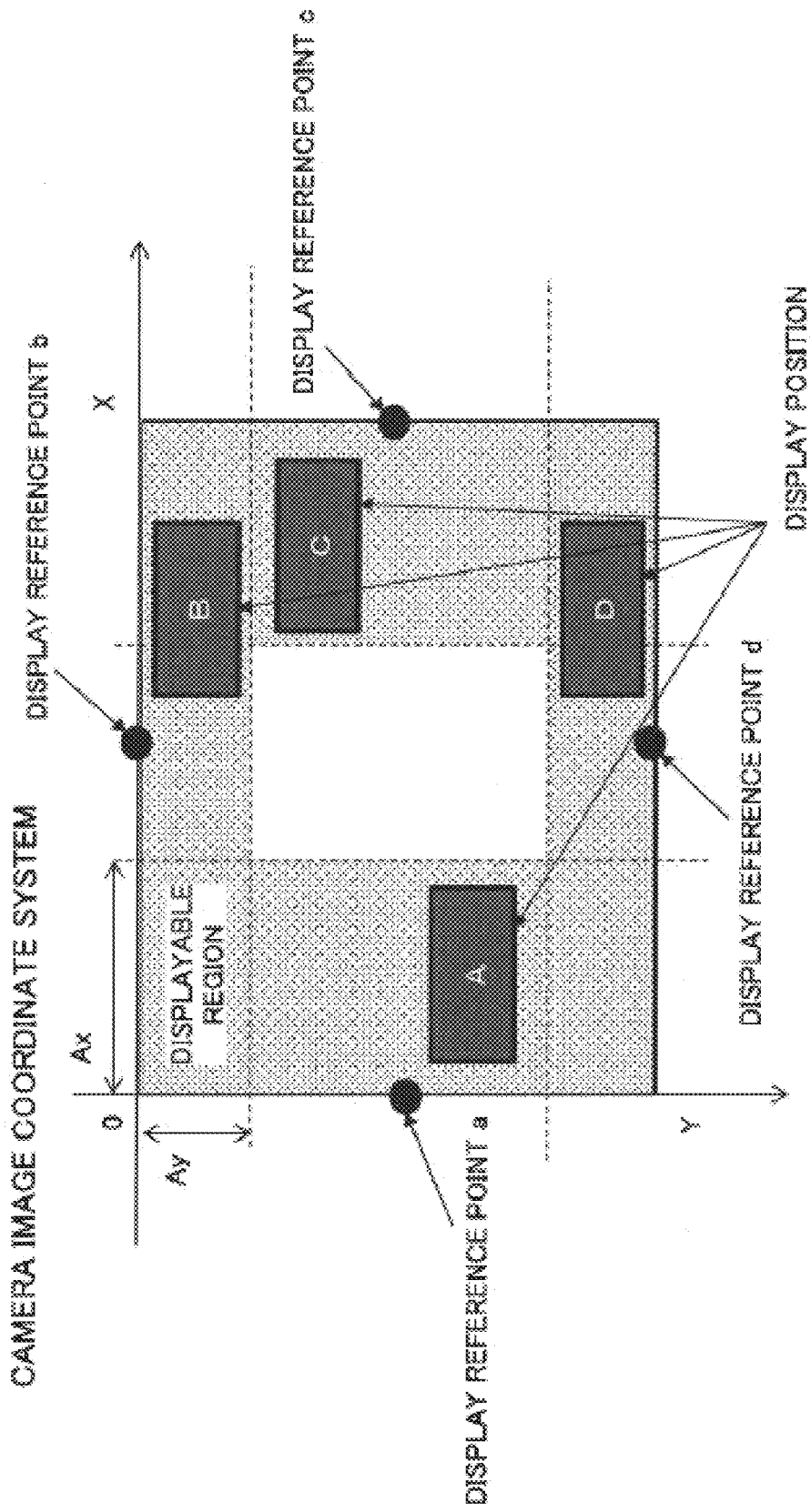
FIG. 13 is a schematic diagram illustrating another example of a determination technique of a display method, according to the second example embodiment of the present invention.

As illustrated in FIG. 13, the display-method determination unit 24 predetermines a point a as a display reference point with respect to a situation expression of the sensor 90, a relative position of which with respect to the camera 80 is stored as "leftward." Then, the display-method determination unit 24 determines a region within a predetermined range from the display reference point (e.g. a rectangular region A) as the display position of the situation expression. Similarly, the display-method determination unit 24 predetermines points b, c, and d as display reference points with respect to situation expressions of sensors 90, relative positions of which with respect to the camera 80 are stored as "above," "rightward," and "below," respectively. Then, the display-method determination unit 24 determines regions within predetermined ranges from the respective display reference points (e.g. rectangular regions B, C, and D) as display positions of the situation expressions.

(103-D) Display-Method Determination Technique Based on Three-Dimensional Position Coordinate It is assumed that the sensor positional relation DB stores a relative position coordinate of the sensor 90 with respect to a position of the camera 80 in a three-dimensional coordinate system. As a position of a signal source, either one of a position of the sensor 90 itself, and a case of using a relative position of the signal source with respect to the position of the sensor 90, may be applied. It is assumed, however, that the position of the signal source is estimated as a three-dimensional position coordinate. In this case, the display-method determination unit 24 may determine a display method as follows.

Figure 14:
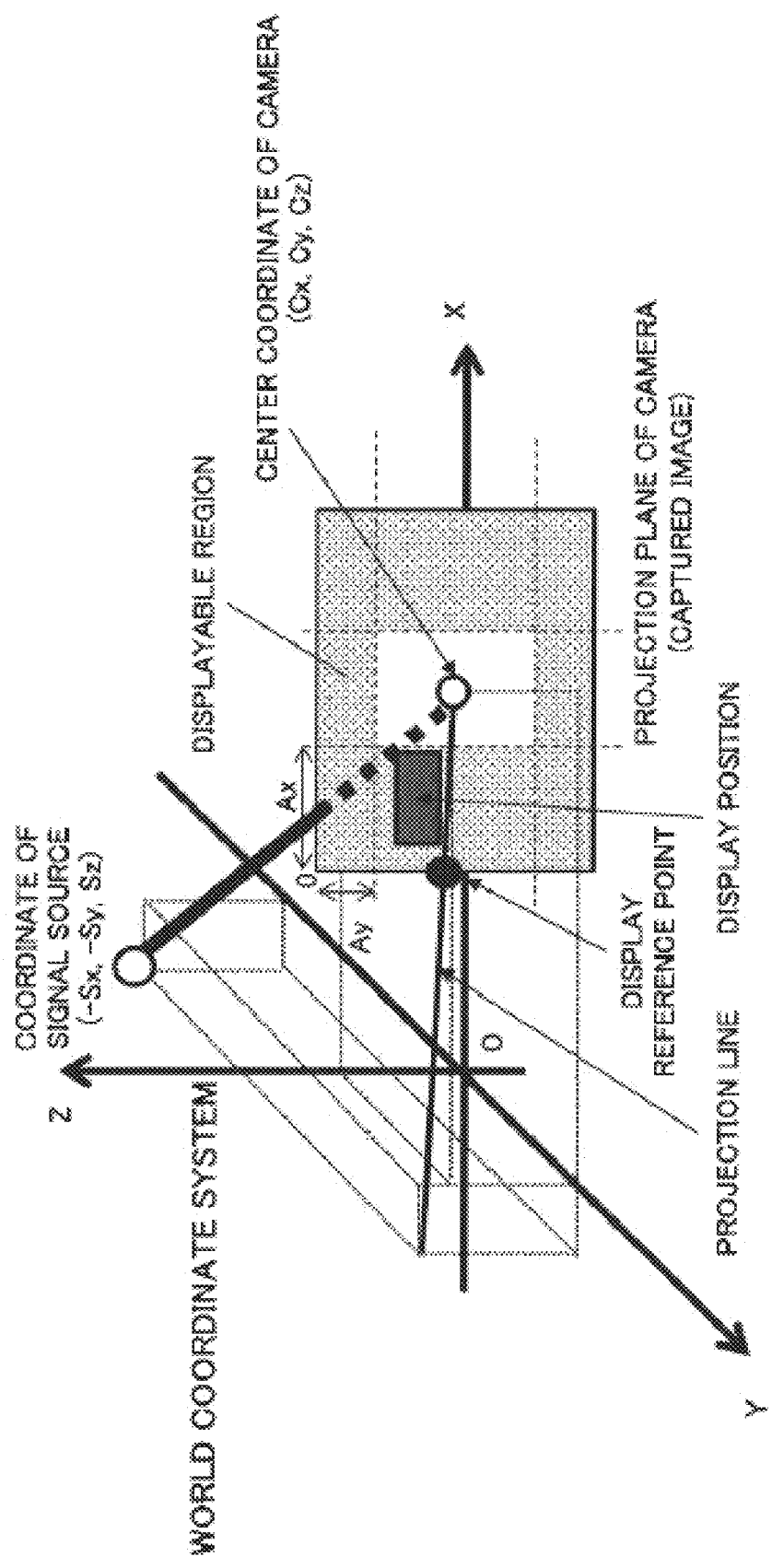
FIG. 14 is a schematic diagram illustrating another example of a determination technique of a display method, according to the second example embodiment of the present invention.

In this case, as illustrated in FIG. 14, the display-method determination unit 24 projects a line connecting an image center (Cx,Cy,Cz) of the camera 80 and a position coordinate (−Sx,−Sy,Sz) of the signal source, in a world coordinate system, onto a projection plane (captured image) of the camera 80. Then, the display-method determination unit 24 sets an intersection of the projection line and a frame of the projection plane of the camera 80 as a display reference point. The display-method determination unit 24 determines a region within a predetermined range from the display reference point as the display position of the situation expression regarding the signal source.

Further, when any one of the aforementioned display-method determination techniques (103-A) to (103-D) is adopted, the display-method determination unit 24 may further determine a size of a situation expression, in accordance with importance set to the sensor 90. Specifically, the display-method determination unit 24 may determine a size of a situation expression so that a situation expression of the sensor 90 of higher importance has a larger size. For example, it is assumed that sensors 90 such as a thermometer and a hygrometer are set with higher importance than another sensor 90. In this case, the display-method determination unit 24 is able to determine to superimpose a situation expression in a larger size with respect to situation expressions regarding the sensors 90 being a thermometer and a hygrometer (expressions indicating an abnormal situation of a space such as occurrence of a fire and a water spill). Consequently, an observer is able to readily notice a situation of higher importance.

Alternatively, the display-method determination unit 24 may determine a size of an extracted situation expression, in accordance with importance set to the situation expression itself, so that a situation expression of higher importance has a larger display region. For example, it is assumed that a specific situation expression (e.g. a situation expression indicating a state of emergency such as "Fire" and "Scream") is set with higher importance than another situation expression. In this case, the display-method determination unit 24 is able to determine to superimpose a situation expression regarding such a state of emergency in a larger size. Consequently, an observer is able to readily notice occurrence of a state of emergency.

Further, the display-method determination unit 24 may hold a flag indicating whether or not to display a balloon and an effect line specifying a direction of a signal source as a display method.

Nearly similarly to the display-method determination unit 14 according to the first example embodiment of the present invention, the presentation unit 25 superimposes a situation expression onto a captured image, in accordance to a display method determined by the display-method determination unit 24, and outputs the captured image superimposed with the situation expression. Further, the presentation unit 25 according to the present example embodiment is able to adopt, for example, the techniques cited below as presentation processing of a situation expression.

(104-A) Technique of Superimposing Situation Expression for Certain Period of Time In this case, the presentation unit 25 superimposes a situation expression onto a same position on a captured image of the camera 80 for a predetermined period of time. For example, it is assumed that an image signal of the camera 80 is input at 30 frames/sec, and a situation expression is extracted once in every 10 seconds. In this case, the presentation unit 25 presents, in a superimposed manner, a situation expression extracted at a time t onto an image of 300 frames input for 10 seconds from the time t, by a same display method.

(104-B) Technique of Superimposing with Balloon and Effect Line

Figure 15:
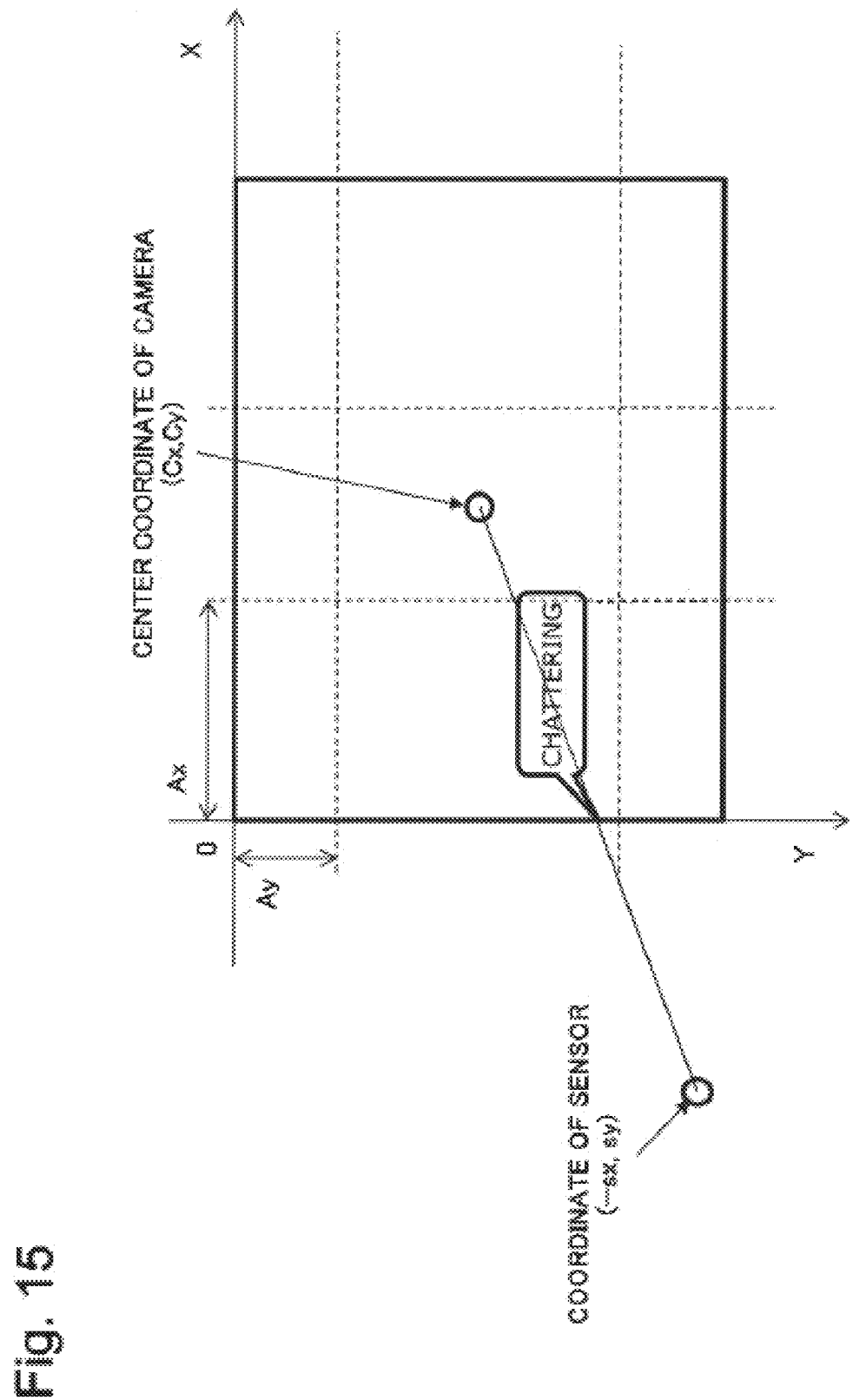
FIG. 15 is a schematic diagram illustrating an example of a superimposition technique of a situation expression, according to the second example embodiment of the present invention.

It is assumed that, in a display method determined by the display-method determination unit 24, a flag for displaying an effect line and a balloon is set. In this case, the presentation unit 25 superimposes a situation expression onto a captured image with a balloon and an effect line. For example, as illustrated in FIG. 15, the presentation unit 25 may display a balloon and an effect line starting from a display reference point. Consequently, an observer is able to intuitively see a display reference point indicating a position of a source of an atmosphere and a situation of an observation space.

Figure 16:
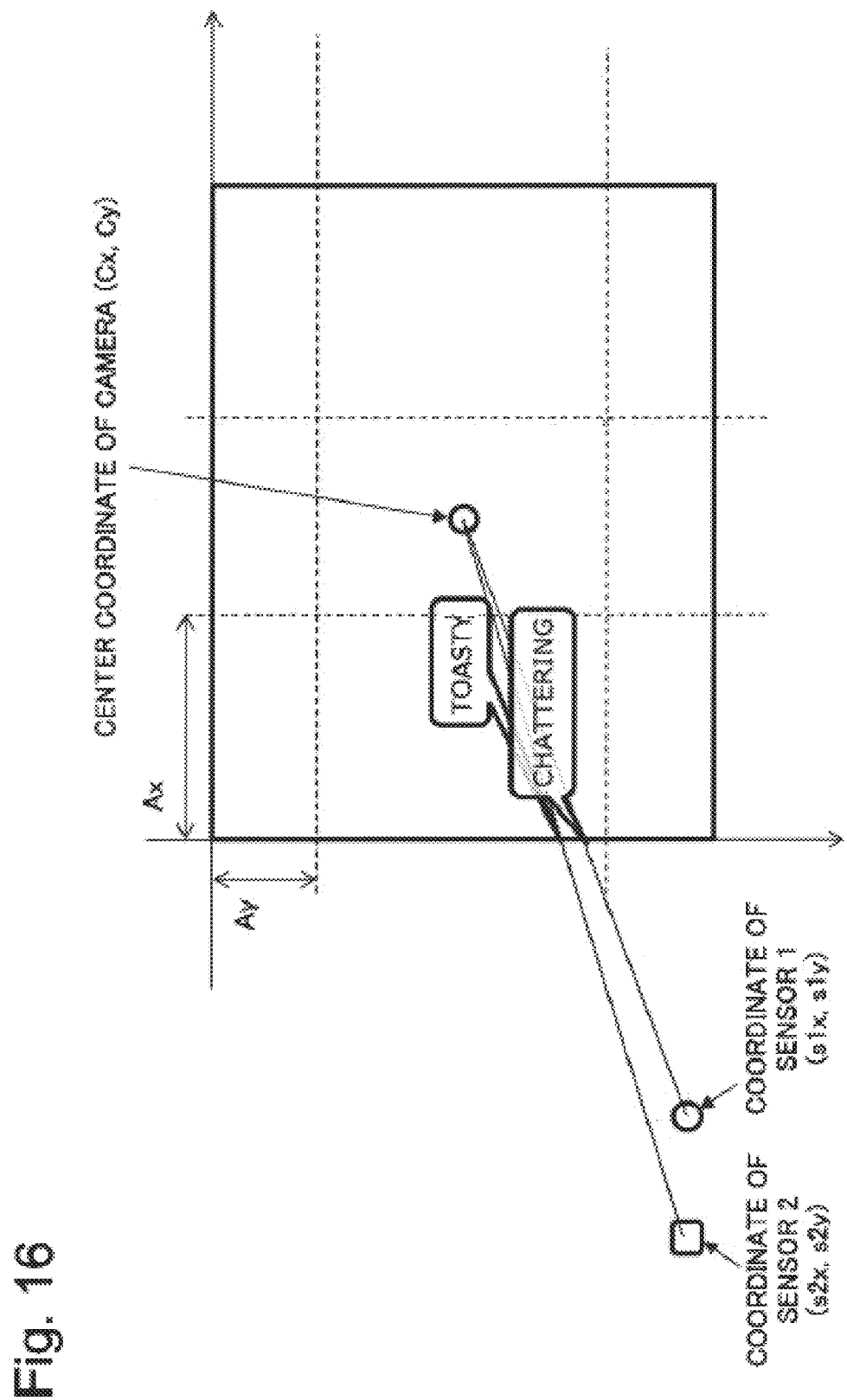
FIG. 16 is a schematic diagram illustrating another example of a superimposition technique of a situation expression, according to the second example embodiment of the present invention.

When an overlapping order of a plurality of situation expressions is determined by the display-method determination unit 24, the presentation unit 25 may display the situation expressions, in accordance with the overlapping order. For example, as illustrated in FIG. 16, the presentation unit 25 may display situation expressions, in accordance with an overlapping order determined by a distance between the sensor 90 and the camera 80. Specifically, the presentation unit 25 may superimpose a situation expression of the sensor 90 closer to the camera 80 in front of the situation expression of a farther sensor 90. Consequently, an observer is able to intuitively see a positional relation between a plurality of signal sources outside a capture range.

(104-C) Technique of Superimposing Situation Expression Extracted from Sensor 90 Within Predetermined Range Only In this case, the presentation unit 25 may superimpose a situation expression extracted from the sensor 90 observing a predetermined observation range, out of one or more sensors 90 included in the information presentation system 2. For example, the sensor 90 observing the predetermined observation range may be a sensor within a predetermined distance range from the camera 80. Consequently, an observer is able to efficiently check an atmosphere and a situation of a specific part particularly preferred to be checked, outside a capture range.

(104-D) Technique of Superimposing Based on Change in Atmosphere and Situation

In this case, the presentation unit 25 may superimpose a situation expression, while changing a size, a transmissivity, a position, and the like thereof for a certain period of time. For example, when a moving human as a signal source is detected by analyzing a signal from the sensor 90, the presentation unit 25 may superimpose a situation expression, while changing a size and a position thereof, for a certain period of time, within a range of the display position determined by the display-method determination unit 24. When a human as a signal source moving toward the camera 80 is detected by analyzing a signal from the sensor 90, the presentation unit 25 may superimpose a situation expression, while reducing a transmissivity thereof, for a certain period of time. When a matter of urgency such as a sharp rise in temperature and humidity is detected by analyzing a signal from the sensor 90, the presentation unit 25 may switch between superimposing and not superimposing a situation expression at certain intervals to blink the situation expression. Further, the presentation unit 25 may change (e.g. proportionate) a change rate of a size and a position, a change rate of a transmissivity, an on-off switching speed of superimposition, and the like, with respect to a situation expression, in accordance with a temporal change of a signal from the sensor 90 such as a moving speed of a human and a rising speed of temperature and humidity. Consequently, the presentation unit 25 is able to convey to an observer not only a position of a source but also a degree of change thereof. Additionally, the presentation unit 25 is able to readily convey to an observer how an event outside a capture range (or within the range) propagates to a situation within the capture range (or outside the range). Propagation of an event or a situation refers to, for example, a state of a human entering a capture range of the camera 80, a state of a human exiting the capture range, and a state of occurrence of buzzing within the captured image in response to buzzing outside the capture range.

(104-E) Technique of Superimposing Situation Expression Within Capture Range Along with Situation Expression Outside Capture Range In this case, the presentation unit 25 may superimpose a situation expression within a capture range of the camera 80 onto a captured image, in addition to a situation expression outside the capture range, by use of a display method determined by the display-method determination unit 24. Consequently, the presentation unit 25 is able to convey to an observer whether or not atmospheres and situations within the capture range and outside the capture range are similar.

(104-F) Technique of Superimposing Situation Outside Capture Range Different from Situation Within Capture Range In this case, out of one or more situation expressions outside a capture range of the camera 80, the presentation unit 25 may superimpose a situation expression different from a situation expression within the capture range. Consequently, the presentation unit 25 is able to convey to an observer an approximate location outside the capture range where a situation different from a situation that can be viewed and heard via the camera 80 occurs.

(104-G) Technique of Superimposing Based on Change in Position and Direction of Camera 80

In this case, the presentation unit 25 may display, in a superimposed manner, a situation expression, in accordance with a situation expression successively extracted and a display method successively determined, in response to a change in position and observation direction of the camera 80. For example, it is assumed that an image signal of the camera 80 is input at 30 frames/sec, and a situation expression and a display method thereof corresponding to a change in position and observation direction of the camera 80 are extracted and determined once in every three seconds, respectively. In this case, the presentation unit 25 presents, in a superimposed manner, a situation expression extracted at a time t onto an image of 90 frames input for three seconds from the time t, in accordance with a display method determined at the time t. Consequently, even when a position and an observation direction of the camera 80 change, the presentation unit 25 is able to convey to an observer a situation outside a capture range, in accordance with the position and the observation direction.

Figure 17:
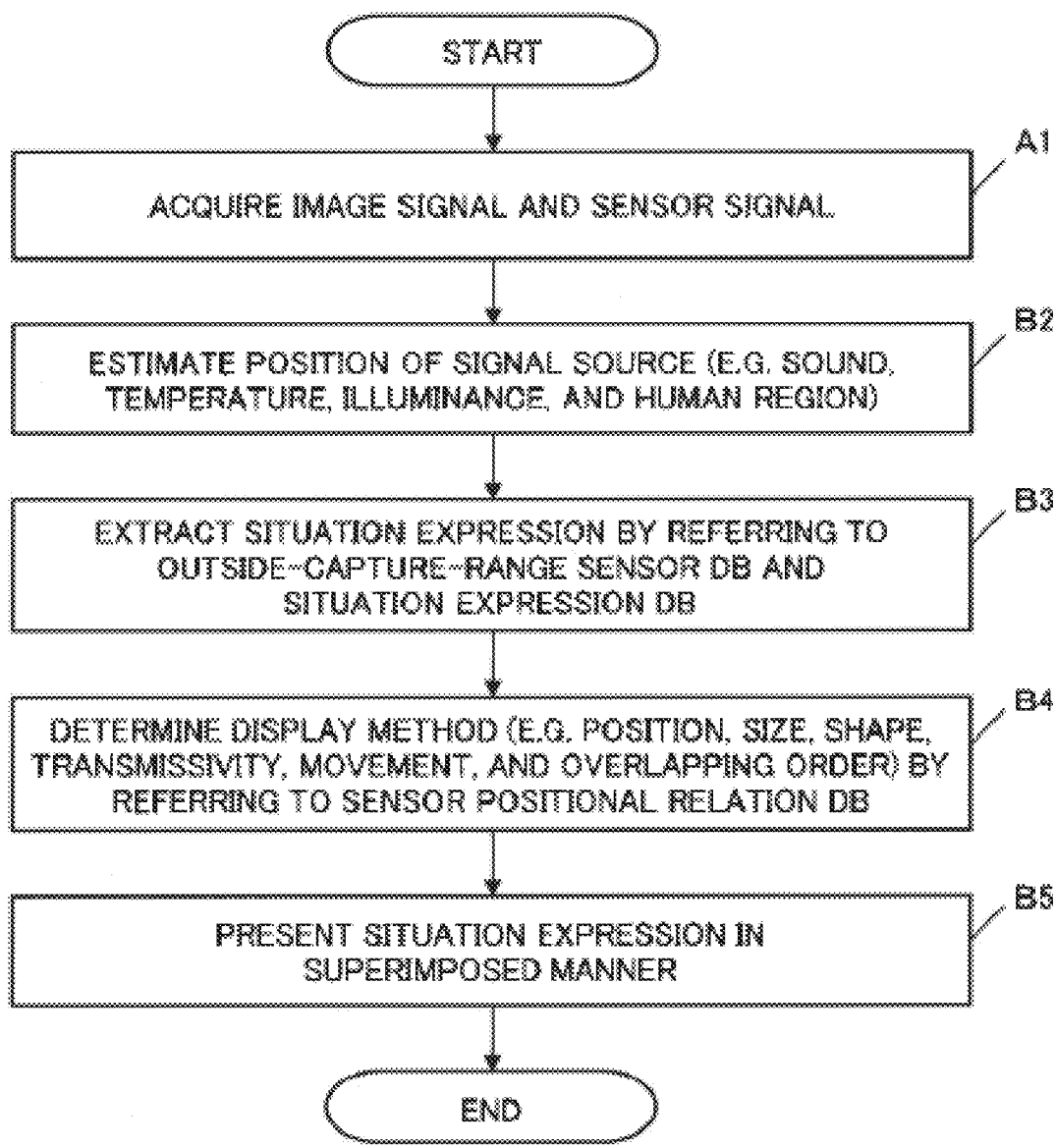
FIG. 17 is a flowchart illustrating an operation of the information presentation system according to the second example embodiment of the present invention.

An operation of the information presentation system 2 configured as described above will be described with reference to FIG. 17.

Similarly to the first example embodiment of the present invention, the signal input unit 11 executes Step A1 and acquires an image signal from the camera 80 and a signal from the sensor 90 as inputs.

Based on the signal from the sensor 90, the signal-source-position estimation unit 22 estimates a position of the sensor 90 itself or a position obtained by analyzing the signal from the sensor 90 as a position of the signal source (Step B2).

For example, with respect to a voice signal, an illuminance signal, and a temperature signal, the signal-source-position estimation unit 22 estimates a position of the sensor 90 outputting the signal as a position of the signal source. Further, with respect to an image signal, the signal-source-position estimation unit 22 analyzes and estimates a position of a human region detected from the signal.

The situation-expression extraction unit 23 extracts a situation expression outside a capture range of the camera 80 by referring to the outside-capture-range sensor DB and the situation expression DB. Additionally, the situation-expression extraction unit 23 may extract a situation expression within the capture range of the camera 80 (Step B3).

Specifically, the situation-expression extraction unit 23 analyzes a signal from an outside-capture-range sensor 90 of the camera 80, being defined by the outside-capture-range DB, and calculates a feature amount of the signal. Then, the situation-expression extraction unit 23 may extract a situation expression in the situation expression DB, being associated with a condition met by the calculated feature amount, as a situation expression outside the capture range of the camera 80. Additionally, when also extracting a situation expression within the capture range, the situation-expression extraction unit 23 analyzes a signal from a sensor 90 within the capture range of the camera 80 defined by the outside-capture-range DB, and calculates a feature amount of the signal. Then, the situation-expression extraction unit 23 may extract a situation expression in the situation expression DB, being associated with a condition met by the calculated feature amount, as a situation expression within the capture range of the camera 80.

The display-method determination unit 24 determines a display method (e.g. a position, a shape, a size, a transmissivity, a movement, and an overlapping order) on a captured image of the camera 80 with respect to the situation expression extracted in Step B3, by referring to the sensor positional relation DB (Step B4).

The presentation unit 25 superimposes each situation expression extracted in Step B3 onto a captured image displayed by the image signal of the camera 80 input in Step A1, in accordance with the display method determined in Step B4, and outputs the captured image superimposed with the situation expression (Step B5).

When a situation expression based on a sensor 90 within the capture range is further extracted in Step B3, the presentation unit 25 may further superimpose the situation expression within the capture range, in addition to the situation expression outside the capture range, in Step B5. Alternatively, out of one or more situation expressions outside the capture range, the presentation unit 25 may superimpose a situation expression different from the situation expression within the capture range.

The above concludes the operation of the information presentation system 2.

The operation of the information presentation system 2 will be described with a specific example.

It is assumed that the information presentation system 2 has an office space as an observation space, and includes three cameras 1 to 3, three microphones 1 to 3, and two thermometers 1 and 2 as cameras 80 and sensors 90, as illustrated in FIG. 5. It is further assumed that the camera 2 is applied as the camera 80 according to the present example embodiment, and the cameras 1 and 3, the microphones 1 to 3, and the thermometers 1 and 2 are applied as sensors 90. It is further assumed that the information presentation system 2 holds the outside-capture-range sensor DB in FIG. 6, the sensor positional relation DB in FIG. 8, and the situation expression DB in FIG. 18. It is further assumed that, with respect to each point on captured images by the cameras 1 and 3, a position coordinate in a camera image coordinate system of the camera 2 is stored in advance as a conversion table. It is further assumed that the information presentation system 2 presets higher importance to the thermometers 1 and 2 than the other sensors 90.

In this case, first, the signal input unit 11 acquires three types of image signals from the cameras 1 to 3, three types of voice signals from the microphones 1 to 3, and two types of temperature signals from the thermometers 1 and 2. Then, the signal input unit 11 applies the image signal from the camera 2 as an image signal from the camera 80 according to the present example embodiment, and applies the other two types of image signals, the three types of voice signals and the two types of temperature signals as signals from the sensors 90 according to the present example embodiment (Step B1).

The signal-source-position estimation unit 22 estimates positions of signal sources, in accordance with the respective signals from the cameras 1 and 3, the microphones 1 to 3, and the thermometers 1 and 2 (Step B2).

The signal-source-position estimation unit 22 applies the positions of the sensors 90 (the microphones 1 to 3 and the thermometers 1 and 2) themselves with respect to the signal sources of the voice signals from the microphones 1 to 3 and the temperature signals from the thermometers 1 and 2, respectively.

Figure 19:
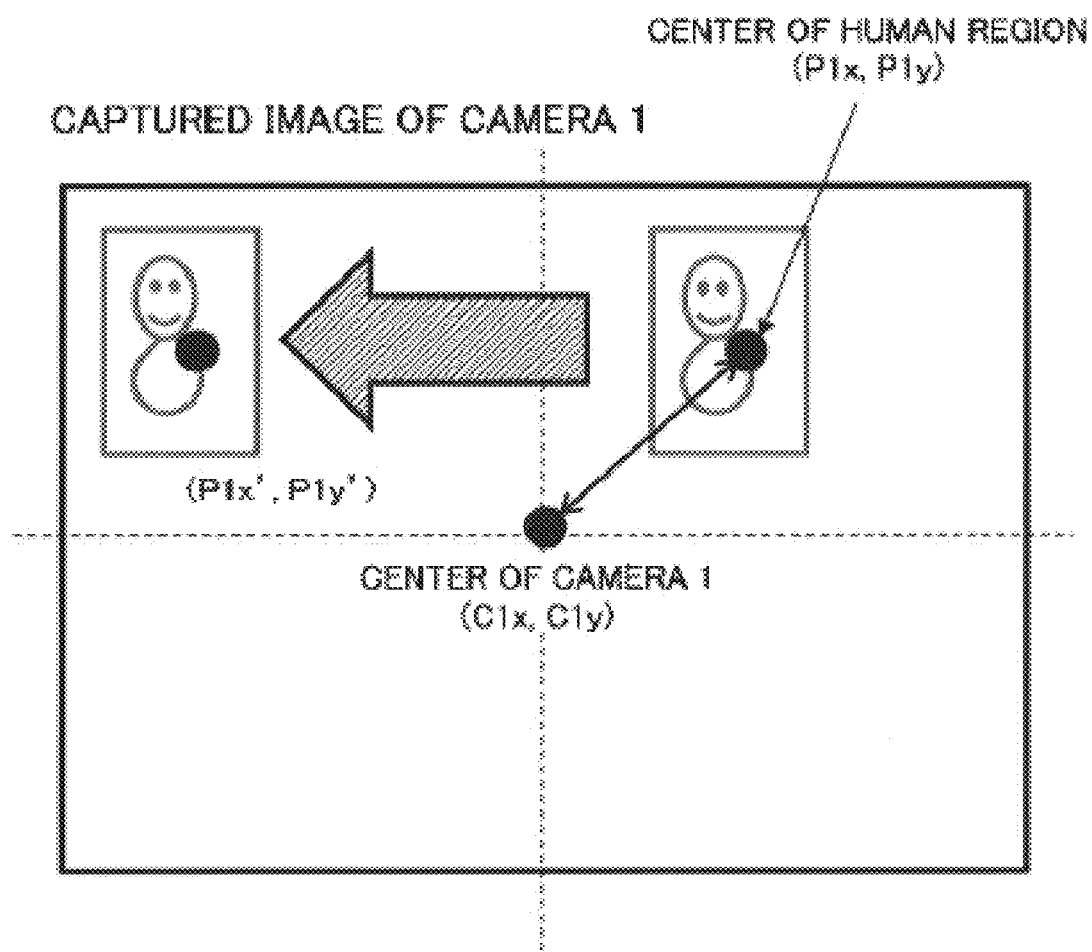
FIG. 19 is a schematic diagram illustrating an example of a human region detected by a sensor, according to the second example embodiment of the present invention.

Further, the signal-source-position estimation unit 22 performs detection processing of a human region on the image signals of the camera 1 and the camera 3 as sensors 90. It is assumed that a human region is not detected in the image signal of the camera 3, and a human region is detected in the image signal of the camera 1. Specifically, as illustrated in FIG. 19, the signal-source-position estimation unit 22 detects a human region with a coordinate (P1$x$,P1$y$) as a center at a time t1 with respect to the image signal from the camera 1, and detects that the center of the human region moves to a coordinate (P1$x'$,P1$y'$) after Δt. The center coordinates of the human region indicate relative positions with respect to a center (C1$x$,C1$y$) of the captured image of the camera 1.

The situation-expression extraction unit 23 refers to the outside-capture-range sensor DB in FIG. 6, and specifies the cameras 1 and 3, the microphones 1 and 3, and the thermometers 1 and 2 as outside-capture-range sensors 90 of the camera 80 (camera 2). Further, the situation-expression extraction unit 23 specifies the microphone 2 as a sensor 90 within the capture range of the camera 80 (camera 2). Then, the situation-expression extraction unit 23 analyzes each signal from the specified sensors 90, and calculates a feature amount. Then, the situation-expression extraction unit 23 refers to the situation expression DB in FIG. 18, and extracts a situation expression associated with a condition met by the feature amount (Step B3).

More precisely, with respect to the human region detected as illustrated in FIG. 19 in the image signal from the camera 1 as an outside-capture-range sensor 90, the situation-expression extraction unit 23 calculates a moving speed thereof, |P1$x$-P1$x'$,P1$y$-P1$y'$|/Δt. |P1$x$-P1$x'$,P1$y$-P1$y'$| denotes a distance between the coordinates (P1$x$,P1$y$) and (P1$x'$, P1$y'$). Further, "/" denotes division. It is assumed that the calculated moving speed is greater than THw2. Then, the situation-expression extraction unit 23 selects a text image "Striding" indicating walking as a situation expression associated with a condition "THw2≤movement of the human region" met by the signal from the camera 1, in accordance with the situation expression DB in FIG. 18. A human region is not detected from a signal of the camera 3 as an outside-capture-range sensor 90, and therefore a feature amount meeting a feature amount condition set in the situation expression DB in FIG. 18 is not detected.

Further, the situation-expression extraction unit 23 calculates a temporal change with respect to a temperature signal from the thermometer 1 as an outside-capture-range sensor 90. It is assumed that, consequently, a temperature change greater than or equal to THh is observed within Δt. Then, the situation-expression extraction unit 23 selects a text image "Fire" as a situation expression associated with a condition "THh<temperature variation" met by the temperature signal from the thermometer 1, in accordance with the situation expression DB in FIG. 18. It is further assumed that a feature amount meeting a feature amount condition set in the situation expression DB in FIG. 18 is not detected from the signal of the thermometer 2 as an outside-capture-range sensor 90.

The situation-expression extraction unit 23 performs frequency analysis and sound level measurement on respective voice signals from the microphones 1 and 3 as outside-capture-range sensors 90 and the microphone 2 as a sensor 90 within the capture range. It is assumed that, consequently, a human voice having a sound level greater than THs1 is observed within Δt in the voice signal from the microphone 1. It is further assumed that a human voice having a sound level less than THs1 is observed within Δt in the voice signal from the microphone 3. Then, the situation-expression extraction unit 23 selects a text image "Buzz-buzz" as a situation expression associated with a condition "voice and THs1≤sound level" met by the voice signal from the microphone 1, in accordance with the situation expression DB in FIG. 18. Further, the situation-expression extraction unit 23 selects a text image "Whispering" as a situation expression associated with a condition "voice and 0<sound level<THs1" met by the voice signal from the microphone 3. It is further assumed that a feature amount meeting a feature amount condition set in the situation expression DB in FIG. 18 is not detected from the signal of the microphone 2 being a sensor 90 within the capture range.

Next, with respect to each sensor 90 (the camera 1, the temperature sensor 1, and the microphones 1 and 3) for which a situation expression is selected, the display-method determination unit 24 acquires a positional relation between a position of the signal source and the camera 80 by referring to the sensor positional relation DB in FIG. 8. Then, the display-method determination unit 24 determines a display method of each situation expression, in accordance with the positional relation (Step B4).

Figure 20:
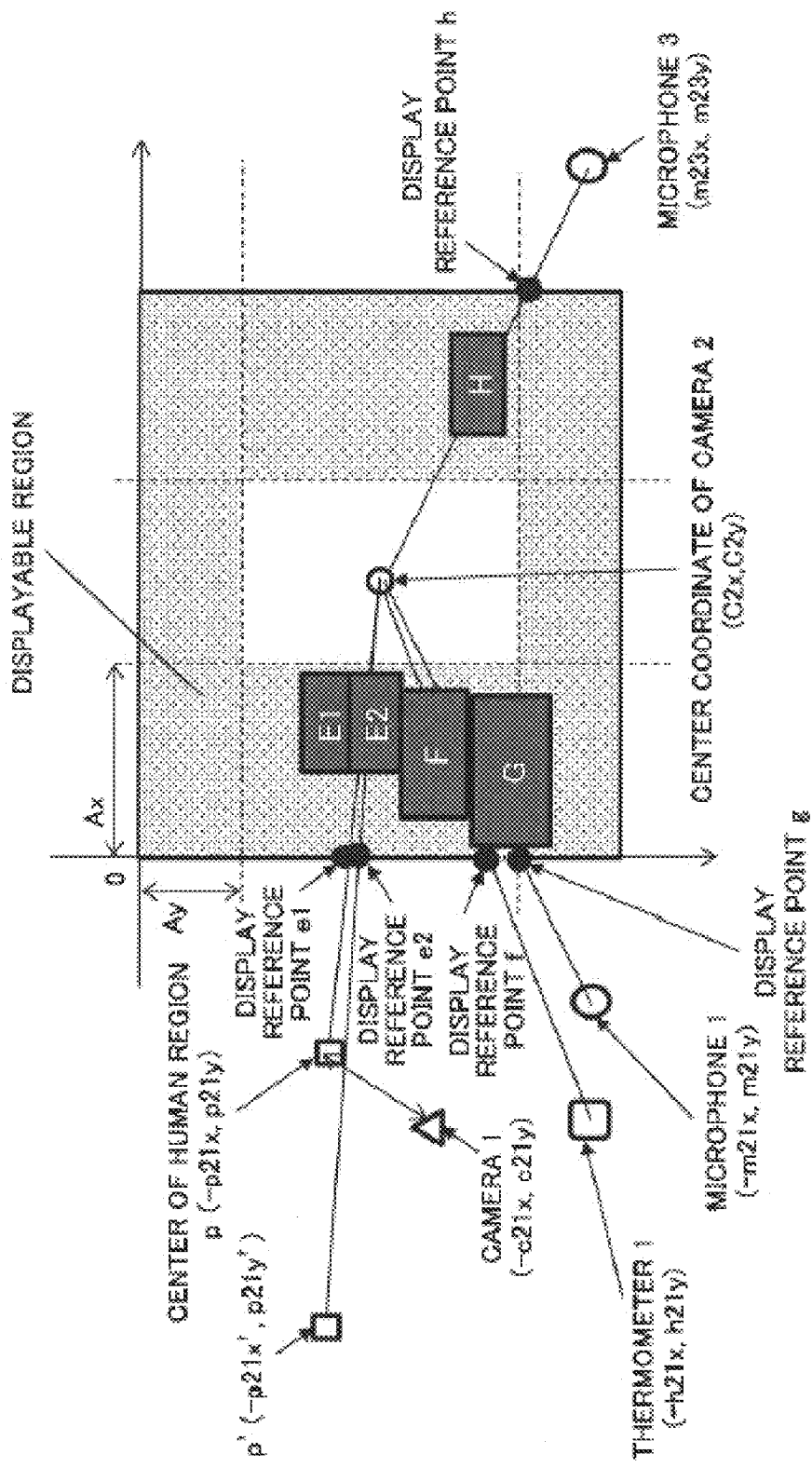
FIG. 20 is a schematic diagram illustrating an example of a display method determined according to the second example embodiment of the present invention.

More precisely, with respect to the center coordinate of the human region of the camera 1 illustrated in FIG. 19, the display-method determination unit 24 obtains a position coordinate in the camera image coordinate system of the camera 2 by referring to the aforementioned conversion table. Consequently, as illustrated in FIG. 20, the human region transitions from a position coordinate p (−p21$x$,p21$y$) to a point p' (−p21$x'$,p21$y'$) within Δt in the camera image coordinate system of the camera 2. Then, the display-method determination unit 24 determines an intersection of a line connecting a center coordinate (C2$x$,C2$y$) of a captured image of the camera 2 and the point p, and a boundary of the captured image of the camera 2, as a first display reference point e1. Further, the display-method determination unit 24 determines an intersection of a line connecting the center coordinate (C2$x$,C2$y$) of the captured image of the camera 2 and the point p', and the boundary of the captured image of the camera 2, as a second display reference point e2. Then, the display-method determination unit 24 sets regions within predetermined ranges from the respective display reference points e1 and e2 (e.g. rectangular regions E1 and E2) as tentative display positions. Additionally, the display-method determination unit 24 determines a region including the tentative display positions E1 and E2 as the display position of the situation expression of the camera 1. Then, the display-method determination unit 24 determines alternate display on the rectangular regions E1 and E2 as a movement of the situation expression of the camera 1.

Further, in FIG. 20, a position of the signal source of the thermometer 1 (a position of the thermometer 1 in this case) is a coordinate (−h21$x$,h21$y$) in the camera image coordinate system of the camera 2. Then, the display-method determination unit 24 determines an intersection of a line connecting the center coordinate of the captured image of the camera 2 and the position coordinate of the thermometer 1, and the boundary of the captured image of the camera 2, as a display reference point f of the situation expression regarding the thermometer 1. Then, the display-method determination unit 24 determines a region within a predetermined range from the display reference point f (e.g. a rectangular region F) as the display position of the situation expression of the thermometer 1.

Further, in FIG. 20, positions of the signal sources of the microphones 1 and 3 (positions of the microphones 1 and 3 in this case) are coordinate $(-m21x,m21y)$ and a coordinate $(m23x,m23y)$, respectively, in the camera image coordinate system of the camera 2. Then, the display-method determination unit 24 determines an intersection of a line connecting the center coordinate of the captured image of the camera 2 and the position coordinate of the microphone 1, and the boundary of the captured image of the camera 2, as a display reference point g of the situation expression regarding the microphone 1. Further, the display-method determination unit 24 determines an intersection of a line connecting the center coordinate of the captured image of the camera 2 and the position coordinate of the microphone 3, and the boundary of the captured image of the camera 2, as a display reference point h of the situation expression regarding the microphone 3. Then, the display-method determination unit 24 determines regions within predetermined ranges from the respective display reference points g and h (e.g. rectangular regions G and H) as respective display positions of the situation expressions of the microphone 1 and the microphone 3.

Further, in FIG. 20, with respect to each of the situation expressions regarding the sensors 90 (the camera 1, the thermometer 1, and the microphones 1 and 3), display-method determination unit 24 determines a size thereof, in accordance with preset importance. In this case, a size of the situation expression of the thermometer 1 set with higher importance is determined to be larger than sizes of the respective situation expressions of the camera 1, and the microphones 1 and 3.

Further, in FIG. 20, with respect to the display position determined for each of the situation expressions regarding the sensors 90 (the camera 1, the thermometer 1, and the microphones 1 and 3), the display-method determination unit 24 adjusts the position, in accordance with a distance between the captured image center of the camera 2 and the position of each signal source. Specifically, a situation expression of a sensor 90 closer to the captured image center of the camera 2, in terms of distance, is adjusted to be at a position closer to the frame of the captured image of the camera 2.

Further, it is assumed that the display-method determination unit 24 set a flag displaying a balloon image for specifying a direction of a signal source.

Figure 21:
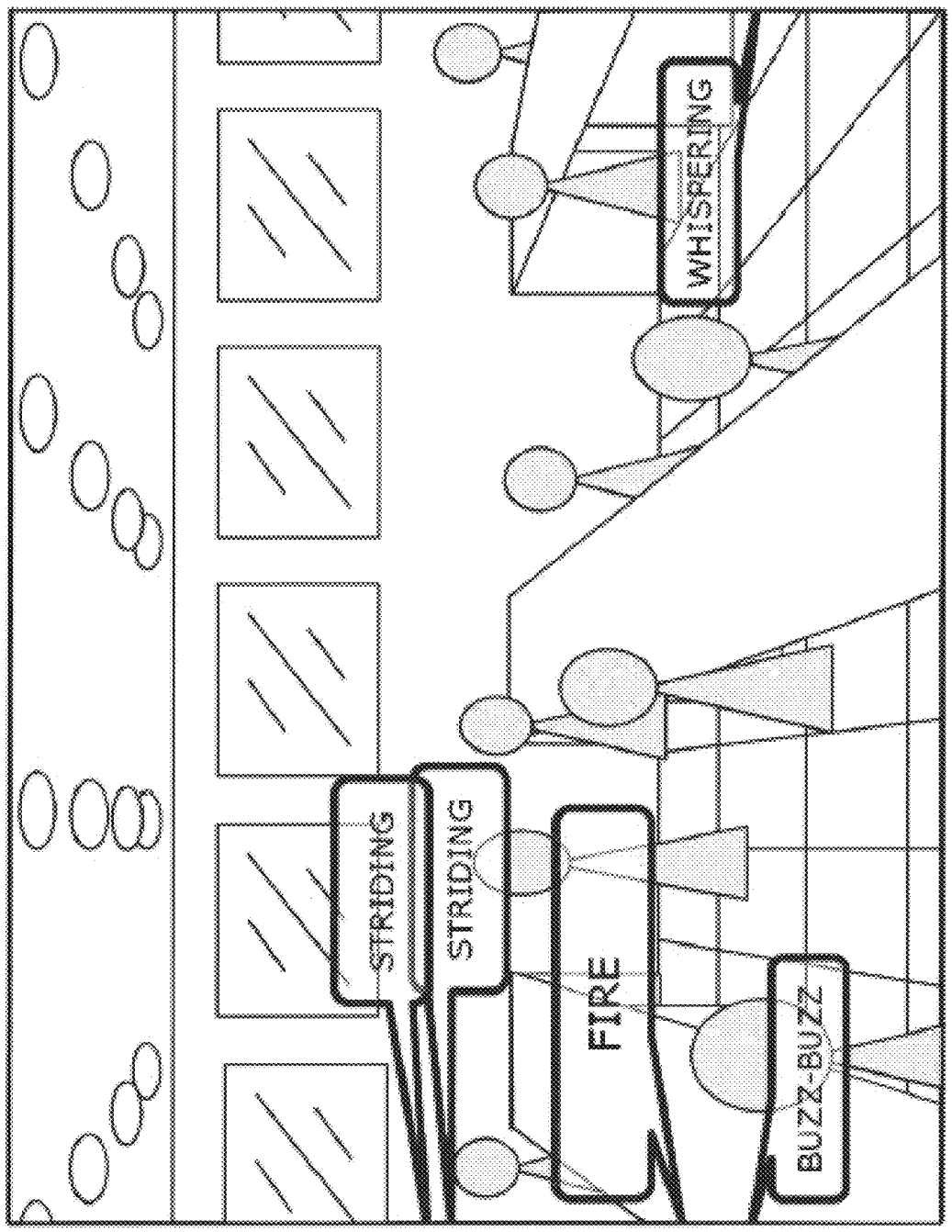
FIG. 21 is a diagram schematically illustrating an example of a captured image on which a situation expression is superimposed and presented, according to the second example embodiment of the present invention.

The presentation unit 25 superimposes each situation expression of the camera 1, the thermometer 1, and the microphones 1 and 3 onto the captured image displayed by the image signal of the camera 2 as the camera 80, in accordance with the display method determined as illustrated in FIG. 20, and outputs the captured image superimposed with the situation expressions (Step B5). Since a situation expression is not extracted from the microphone 2 as a sensor 90 within the capture range, the presentation unit 25 superimposes the situation expressions outside the capture range, and does not superimpose a situation expression within the capture range. FIG. 21 illustrates an example of an output captured image. In FIG. 21, a captured image by the camera 2 is schematically illustrated.

For example, in FIG. 21, the presentation unit 25 superimposes the text image "Striding" of the situation expression of the camera 1 onto the determined rectangular regions E1 and E2 alternately, for a certain period of time. Further, the presentation unit 25 superimposes the text image "Fire" of the situation expression of the thermometer 1 onto the determined rectangular region F in a larger size than the other situation expressions. Further, the presentation unit 25 superimposes the text images "Buzz-buzz" and "Whispering" being the respective situation expressions of the microphone 1 and the microphone 3 onto the determined rectangular regions G and H, respectively. Further, since the flag displaying a balloon image as a display method is set in Step B4, the presentation unit 25 displays each situation expression with a balloon image, and sets a starting point of the balloon at the corresponding display reference point.

The above concludes the description of the specific example.

Next, an effect of the second example embodiment of the present invention will be described.

When presenting a captured image by a camera, the information presentation system according to the second example embodiment of the present invention is able to more sufficiently convey a situation outside a capture range in a space including the capture range.

The reason is as follows. According to the present example embodiment, the signal input unit acquires an image signal from the camera and a signal from a sensor as inputs, and the signal-source-position estimation unit estimates a position of the signal source, in accordance with the signal from the sensor. Then, the situation-expression extraction unit extracts a situation expression outside a capture range corresponding to a condition met by a feature amount of the signal from the sensor outside the capture range, by use of the outside-capture-range sensor DB and the situation expression DB. Then, by referring to the sensor positional relation DB, the display-method determination unit calculates a positional relation between the capture range and the position of the signal source, and determines a position, a shape, a size, a transmissivity, a movement, an overlapping order, and the like as a display method of the situation expression on a captured image, in accordance with the calculated positional relation. Then, the presentation unit superimposes the situation expression onto the captured image, in accordance with the determined display method, and outputs the captured image superimposed with the situation expression.

The present example embodiment may store a situation expression associated with a combination of pieces of information about a plurality of signals in the situation expression DB, and extract a situation expression by the situation-expression extraction unit, in accordance with a combination of pieces of information about a plurality of signals. Consequently, the present example embodiment is able to convey to an observer a situation expression more precisely representing a situation outside the capture range.

The present example embodiment may determine a display method such as a size of a situation expression by the display-method determination unit, in accordance with importance of the sensor or the situation expression. Consequently, the present example embodiment is able to more intelligibly convey to an observer a situation of high importance outside the capture range.

The present example embodiment may determine a display method such as a position and an overlapping order of each situation expression by the display-method determination unit, in accordance with a distance relation between the capture range and a signal source. Consequently, the present example embodiment is able to more intuitively convey to an observer a positional relation between a plurality of signal sources.

When the display-method determination unit determines to superimpose only a situation expression extracted from a sensor in a predetermined range, the present example embodiment is able to efficiently convey an atmosphere and a situation of a specific part an observer prefers to check.

The present example embodiment may determine a display method of each situation expression by the display-method determination unit, in accordance with a temporal change of a position and a feature amount of a signal source. Consequently, the present example embodiment is able to readily convey to an observer a degree of change in a situation outside a capture range and how an event outside the capture range (or within the range) propagates to a situation within the capture range (or outside the range).

Further, in addition to a situation expression outside the capture range, the present example embodiment may superimpose a situation expression within the capture range onto the captured image by the presentation unit. Consequently, the present example embodiment is able to convey to an observer whether or not atmospheres and situations within the capture range and outside the capture range are similar.

Further, out of one or more situation expressions outside the capture range, the present example embodiment may superimpose a situation expression different from a situation expression within the capture range by the presentation unit. Consequently, the present example embodiment is able to convey to an observer an approximate location outside the capture range where a situation different from a situation that can be viewed and heard occurs.

Further, even when a position and an observation direction of the camera or a sensor change, the present example embodiment determines a display method of a situation expression, in accordance with the change, and therefore is able to more precisely convey to an observer a situation outside the capture range.

An example of observing an indoor office space as illustrated in FIG. 5, according to the aforementioned second example embodiment of the present invention, has been mainly described. In this case, the information presentation system according to the present example embodiment is applicable to a use for conveying to and sharing with an observer (at a physically remote location, for example) an atmosphere and a situation of an office space being an observation target. In addition, the space being an observation target of the information presentation system according to the present example embodiment is not limited to an indoor space but may also be, for example, an outdoor space.

Further, the information presentation system according to the second example embodiment of the present invention is also applicable to a supervisory system supervising an anomaly in a space. In this case, the information presentation system may detect a signal from a sensor indicating an anomaly in the space such as an alarm bell, a scream such as "Thief," a "gunshot," and detection of a human region during a specific time period. In this case, the information presentation system may extract a situation expression indicating an anomaly such as "Alarm bell," "Thief," and "Bang," in accordance with the detected information, and display the situation expression on a captured image in a superimposed manner. In this case, when presenting an outdoor or indoor supervisory video image being a supervisory target, the present example embodiment is able to convey to a supervisor a situation of anomaly occurrence outside a capture range in the space to be supervised.

An example of prestoring the situation expression DB, the sensor positional relation DB, and the outside-capture-range sensor DB in a storage apparatus, according to the second example embodiment of the present invention, has been mainly described. In addition, the information presentation system according to the present example embodiment may be configured to make an inquiry to an external apparatus storing equivalent information to the various types of databases.

An example of each functional block in the information presentation apparatuses according to the respective aforementioned example embodiments of the present invention being implemented by a CPU executing a computer program stored in a storage apparatus or a ROM has been mainly described. Without being limited thereto, the respective functional blocks, in part or in whole, or a combination thereof, may be implemented by dedicated hardware.

A functional block of the information presentation apparatuses according to the respective aforementioned example embodiments of the present invention may be implemented in a distributed manner on a plurality of apparatuses.

The operations of the information presentation apparatuses according to the respective aforementioned example embodiments of the present invention, being described with reference to the respective flowcharts, may be stored in a storage apparatus (storage medium) of a computer as a computer program according to the present invention. Then, the CPU may read and execute such a computer program. In such a case, the present invention is composed of a code of such a computer program or a storage medium.

The respective aforementioned example embodiments may be implemented in combination as appropriate.

The present invention has been described with the aforementioned example embodiments as exemplary examples. However, the present invention is not limited to the aforementioned example embodiments. In other words, various embodiments that can be understood by a person skilled in the art may be applied to the present invention, within the scope thereof.

This application claims priority based on Japanese Patent Application No. 2014-125866 filed on Jun. 19, 2014, the disclosure of which is hereby incorporated by reference thereto in its entirety.

REFERENCE SIGNS LIST 1, 2 Information presentation system
10, 20 Information presentation apparatus
11 Signal input unit
12, 22 Signal-source-position estimation unit
13, 23 Situation-expression extraction unit
14, 24 Display-method determination unit
15, 25 Presentation unit
80 Camera
90 Sensor
1001 CPU
1002 RAM
1003 ROM
1004 Storage apparatus
1005 Peripheral-equipment connection interface
1006 Display apparatus

The invention claimed is:
1. An information presentation apparatus comprising:
a processor configured to:
receive an image signal from a camera and a signal from each of a plurality of sensors;

for each sensor, estimate a position of a signal source based on the signal from the sensor;

for each sensor, extract information on a situation expression expressing a situation based on the signal from the sensor;

superimpose the situation expression for each sensor on a captured image by the camera and output the captured image superimposed with the situation expression for each sensor; and in a case in which the plurality of sensors are located at different positions and a plurality of images representing each situation expression for each sensor overlap at least partially on the captured image, determine an overlapping order of the plurality of images representing each situation expression for each sensor superimposed on the captured image based on a distance between the camera and each sensor.

2. The information presentation apparatus according to claim 1, wherein
the processor, for each sensor, extracts the situation expression expressing a situation outside a capture range of the camera in accordance with the signal from the sensor in a case in which the sensor is located outside the capture range of the camera.

3. The information presentation apparatus according to claim 1, wherein,
the processor, for each sensor, extracts the situation expression expressing a situation within a capture range of the camera in accordance with the signal from the sensor predetermined in a case in which the sensor is located within the capture range of the camera.

4. The information presentation apparatus according to claim 1, wherein,
the processor further configured to:
determine a display method of displaying the situation expression for each sensor on the captured image based on at least one of moving speed and moving direction of the signal source estimated for the sensor.

5. An information presentation method comprising:
by a processor,
receiving an image signal from a camera and a signal from each of a plurality of sensors;
for each sensor, estimating a position of a signal source based on the signal from the sensor;
for each sensor, extracting information on a situation expression expressing a situation based on the signal from the sensor;
superimposing the situation expression for each sensor on a captured image by the camera and outputting the captured image superimposed with the situation expression for each sensor; and
in a case in which the plurality of sensors are located at different positions and a plurality of images representing each situation expression for each sensor overlap at least partially on the captured image, determining an overlapping order of the plurality of images representing each situation expression for each sensor superimposed on the captured image based on a distance between the camera and each sensor.

6. The information presentation method according to claim 5, wherein
in a processing to extract the situation expression for each sensor, the processor extracts the situation expression expressing a situation outside a capture range of the camera in accordance with the signal from the sensor in a case in which the sensor is located outside the capture range of the camera.

7. The information presentation apparatus according to claim 5, wherein,
in a processing to extract the situation expression for each sensor, the processor extracts the situation expression expressing a situation within a capture range of the camera in accordance with the signal from the sensor in a case in which the sensor is located within the capture range of the camera.

8. The information presentation apparatus according to claim 5, further comprising,
by the processor,
determining a display method of displaying the situation expression for each sensor on the captured image based on at least one of moving speed and moving direction of the signal source estimated for the sensor.

9. A non-transitory computer readable storage medium storing a program, the program causing a computer to perform:
receiving an image signal from a camera and a signal from each of a plurality of sensors;
for each sensor, estimating a position of a signal source based on the signal from the sensor;
for each sensor, extracting information on a situation expression expressing a situation based on the signal from the sensor;
superimposing the situation expression for each sensor on a captured image by the camera and outputting the captured image superimposed with the situation expression for each sensor; and
in a case in which a plurality of sensors are located at different positions and a plurality of images representing each situation expression for each sensor superimpose at least partially on the captured image, determining a superimposing order of the plurality of images representing each situation expression for each sensor superimposed on the captured image based on a distance between the camera and each sensor.

10. The non-transitory computer readable storage medium according to claim 9, wherein
in a processing to extract the situation expression for each sensor, the program causes the computer to perform extracting the situation expression expressing a situation outside a capture range of the camera in accordance with the signal from the sensor in a case in which the sensor is located outside the capture range of the camera.

11. The non-transitory computer readable storage medium according to claim 9, wherein,
in a processing to extract the situation expression for each sensor, the program causes the computer to perform extracting the situation expression expressing a situation within a capture range of the camera in accordance with the signal from the sensor in a case in which the sensor located within the capture range of the camera.

12. The non-transitory computer readable storage medium according to claim 9, wherein,
the program causes further the computer to perform determining a display method of displaying the situation expression for each sensor on the captured image based on at least one of moving speed and moving direction of the signal source estimated for the sensor.

* * * * *